US007191402B2

(12) United States Patent
Kim et al.

(10) Patent No.: US 7,191,402 B2
(45) Date of Patent: Mar. 13, 2007

(54) METHOD AND APPARATUS FOR ADJUSTING CONTRAST AND SHARPNESS FOR REGIONS IN A DISPLAY DEVICE

(75) Inventors: Young-Kyu Kim, Kyunggi-do (KR); Jae-Sung Kang, Kyunggi-do (KR); Im-Soo Kang, Kyunggi-do (KR); Joon-Hee Jo, Kyunggi-do (KR); Ji-Hyun Lee, Kyunggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 657 days.

(21) Appl. No.: 10/123,392

(22) Filed: Apr. 15, 2002

(65) Prior Publication Data

US 2002/0180812 A1    Dec. 5, 2002

(30) Foreign Application Priority Data

| May 10, 2001 | (KR) | ............................... 2001-25576 |
| Jun. 8, 2001 | (KR) | ............................... 2001-31972 |
| Mar. 25, 2002 | (KR) | ............................... 2002-16165 |

(51) Int. Cl.
*G11B 27/00* (2006.01)
*G09G 5/00* (2006.01)
*G09G 5/02* (2006.01)

(52) U.S. Cl. ...................... 715/723; 345/617; 345/698
(58) Field of Classification Search ................ 715/719, 715/723; 345/581, 698, 617
See application file for complete search history.

(56) References Cited

U.S. PATENT DOCUMENTS

| 5,212,545 A | * | 5/1993 | Kageyama | .................. 348/655 |
| 5,247,358 A | | 9/1993 | Richards | |
| 5,418,576 A | | 5/1995 | Ross | |
| 5,453,764 A | * | 9/1995 | Inagaki | ....................... 345/547 |

(Continued)

FOREIGN PATENT DOCUMENTS

JP           4-249294           9/1992

(Continued)

OTHER PUBLICATIONS

English language abstract of Japanese Publication No. 4-249294.

(Continued)

*Primary Examiner*—Kieu D. Vu
*Assistant Examiner*—Ting Zhou
(74) *Attorney, Agent, or Firm*—Marger Johnson & McCollom, P.C.

(57) ABSTRACT

A partial region on a screen can be selected for highlighting. Information related to the partial region is transmitted from a computer to a computer monitor. In one embodiment, the partial region information is sent over a different port from the one used to send video data. The image processor adjusts contrast and sharpness of the partial region according to the partial region information. Adjustments are made for differences in a coordinate system between the computer site and the display device. The partial region can be selected from the computer or from a user interface on the computer monitor. Selected partial regions can be moved in conjunction with movements of windows containing the image. Highlighted selected regions can also be automatically disabled when the window is deactivated.

38 Claims, 18 Drawing Sheets a captured photograph for the moving image in which a region to be selected is highlighted .

U.S. PATENT DOCUMENTS

| | | | |
|---|---|---|---|
| 5,590,271 A * | 12/1996 | Klinker | 715/763 |
| 5,654,743 A | 8/1997 | Hu et al. | |
| 5,825,938 A | 10/1998 | DE Lange | |
| 5,889,500 A | 3/1999 | Chuang et al. | |
| 5,889,565 A | 3/1999 | Brennesholtz | |
| 6,008,836 A * | 12/1999 | Bruck et al. | 725/131 |
| 6,097,352 A * | 8/2000 | Zavracky et al. | 345/7 |
| 6,140,994 A | 10/2000 | Schaffstein et al. | |
| 6,362,829 B1 * | 3/2002 | Omvik et al. | 345/593 |
| 6,456,292 B1 * | 9/2002 | Chan et al. | 345/589 |
| 6,614,987 B1 * | 9/2003 | Ismail et al. | 386/83 |
| 6,757,707 B1 * | 6/2004 | Houghton et al. | 709/203 |
| 2001/0017619 A1 * | 8/2001 | Takeuchi | 345/204 |
| 2001/0026644 A1 * | 10/2001 | Endo et al. | 382/282 |
| 2002/0071055 A1 * | 6/2002 | Ooshima et al. | 348/552 |
| 2002/0080107 A1 * | 6/2002 | Fujimoto et al. | 345/87 |
| 2002/0080278 A1 * | 6/2002 | Lee et al. | 348/576 |

FOREIGN PATENT DOCUMENTS

| | | |
|---|---|---|
| KR | 1994-0000951 | 2/1994 |
| WO | WO 99/35854 | 7/1999 |

OTHER PUBLICATIONS

English language abstract of Korean Publication No. 1994-0000951.

* cited by examiner

[FIG. 1] a conventional computer system
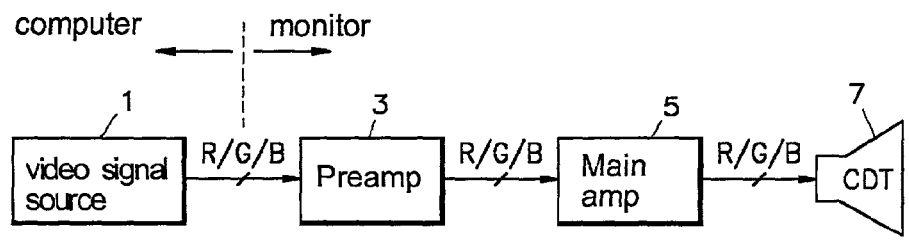
[FIG. 2] a block diagram of a computer system including a contrast and sharpness adjusting apparatus
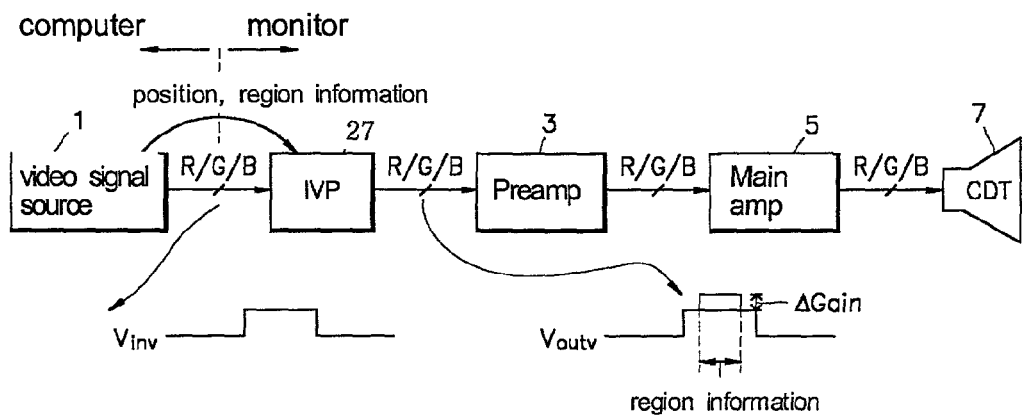
[FIG. 3] a detailed diagram of the computer system of FIG. 2
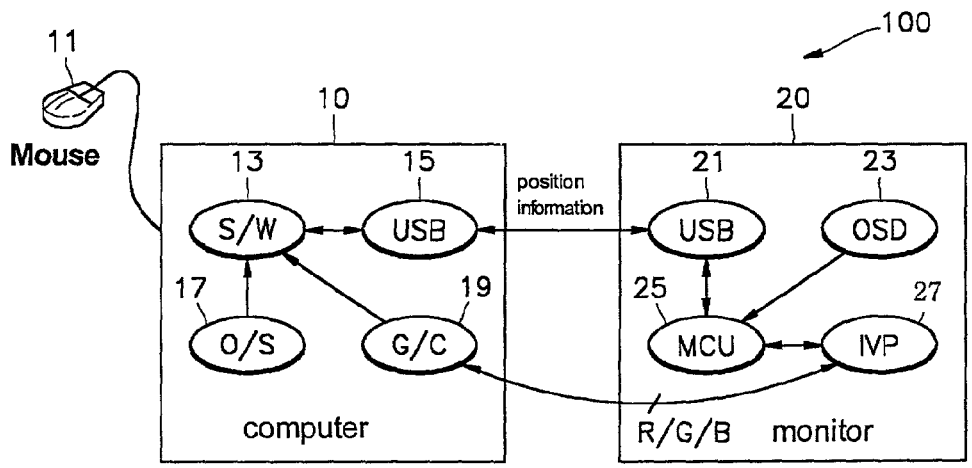

[FIG. 4] a schematic block diagram of a contrast and sharpness adjusting apparatus
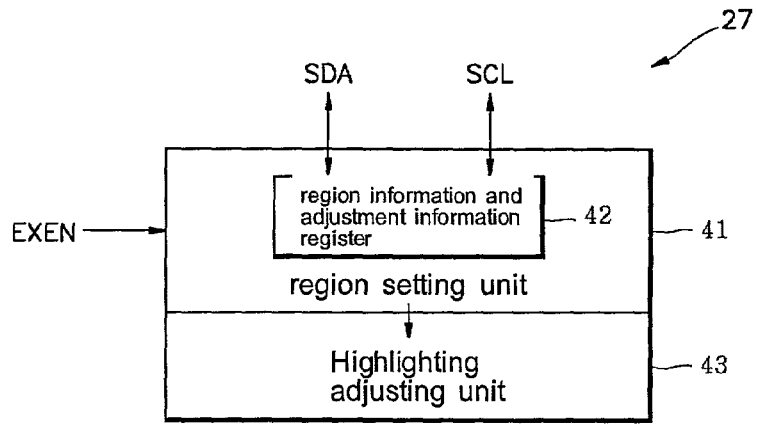
[FIG. 5] a flowchart of a method of setting a region using an on screen display
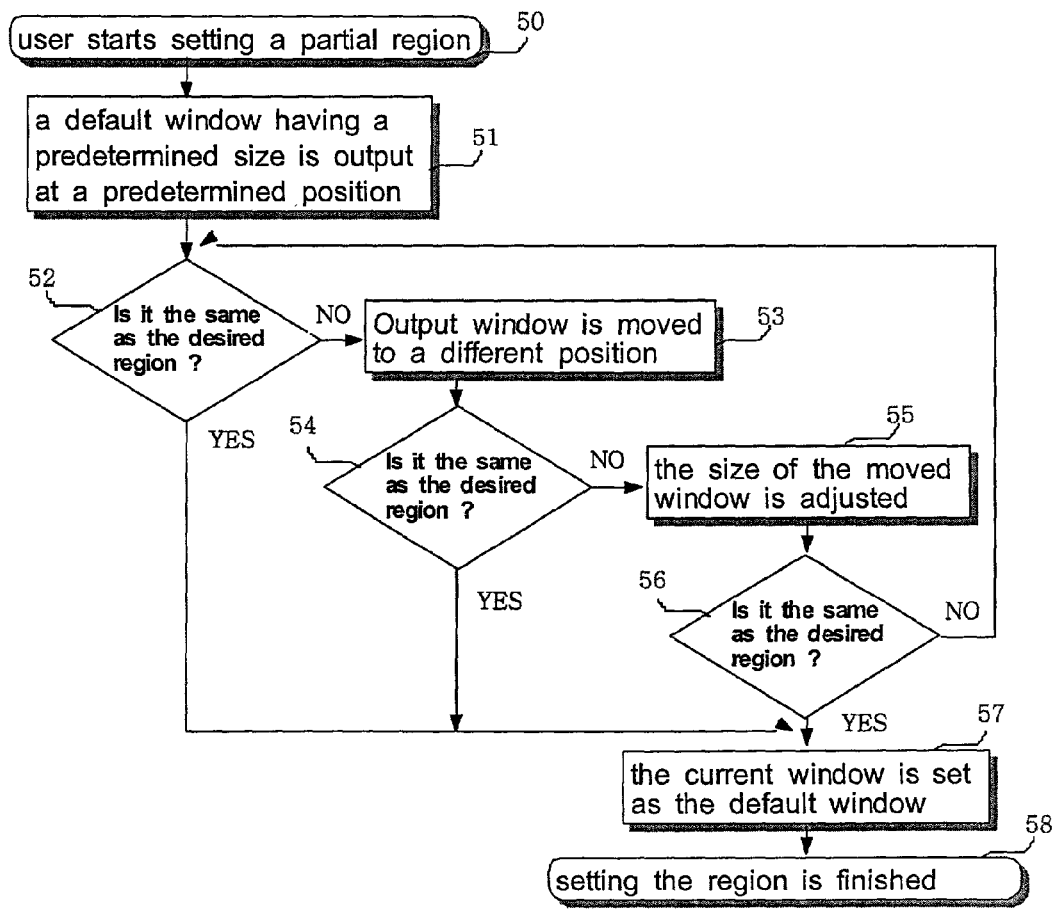

FIG. 6A a schematic block diagram for explaining a method of transmitting information and adjustment information about the set region to a contrast and sharpness adjusting apparatus using software (S/W)
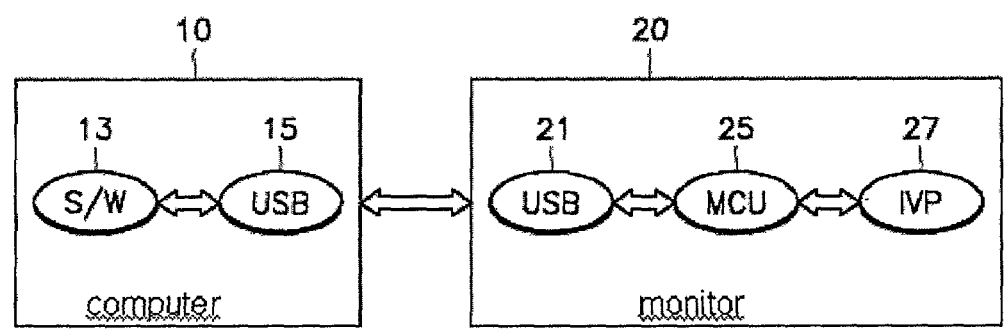

FIG. 7 a conceptual view showing a method for setting a region having a shape other than quadrangle by an external enable signal
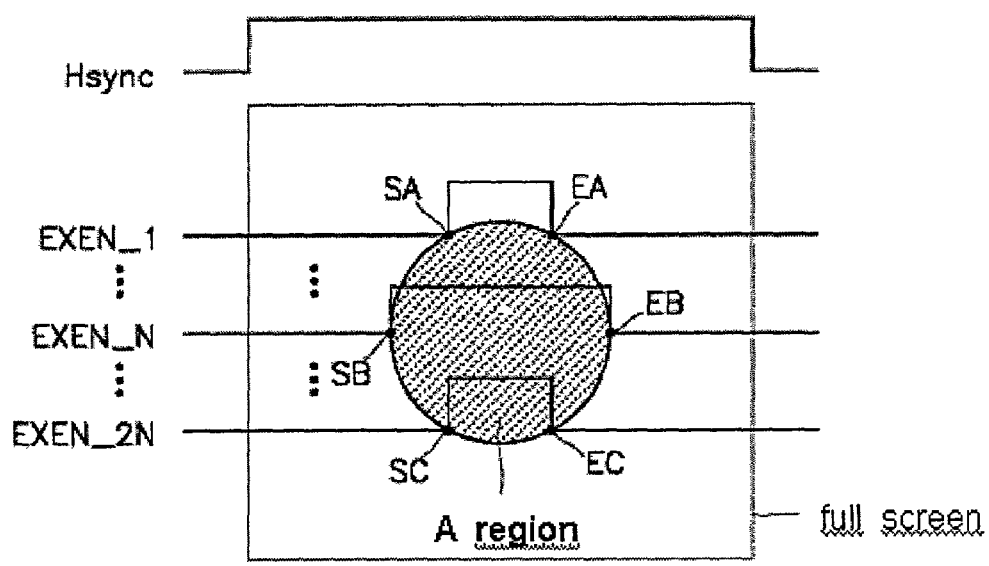

[FIG. 8] a timing diagram schematically showing a method for compensating for an error using a two-stage phase-locked loop (PLL)

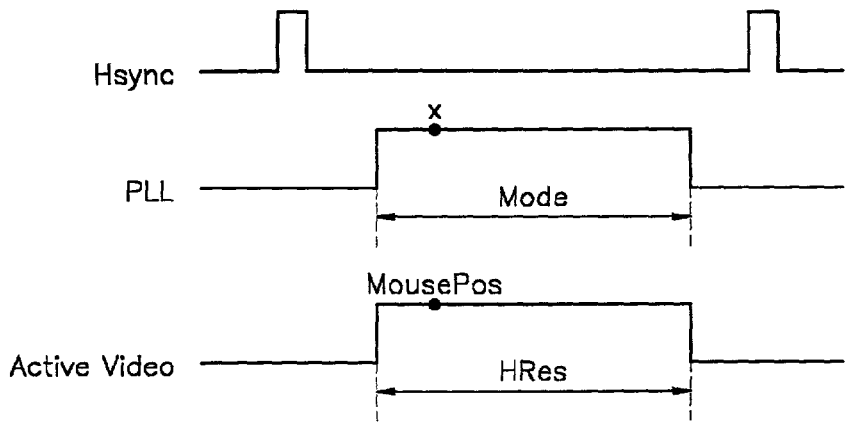

[FIG. 9] a timing diagram schematically showing a method for compensating for an error using a horizontal synchronization signal and an active video signal

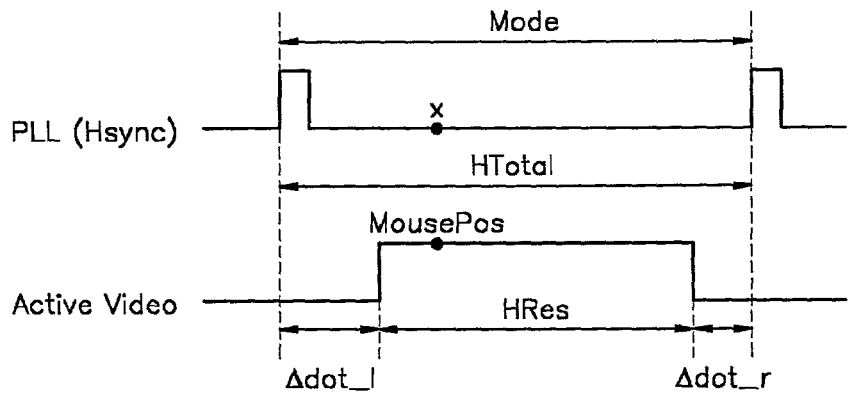

[FIG. 10] a timing diagram schematically showing a method for compensating for an error using the output signal of a graphic card and an active video signal

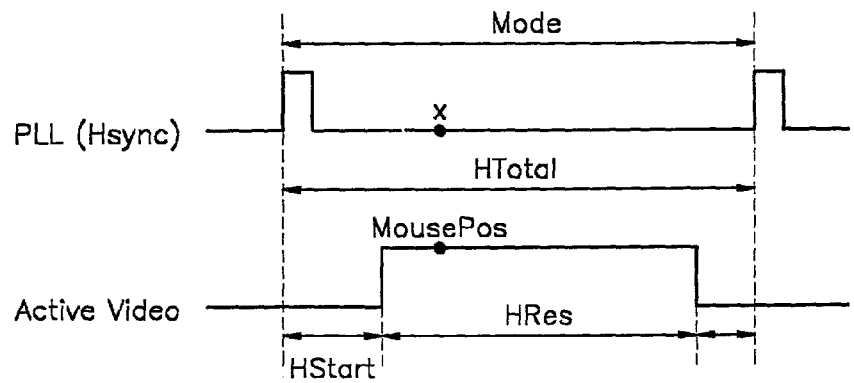

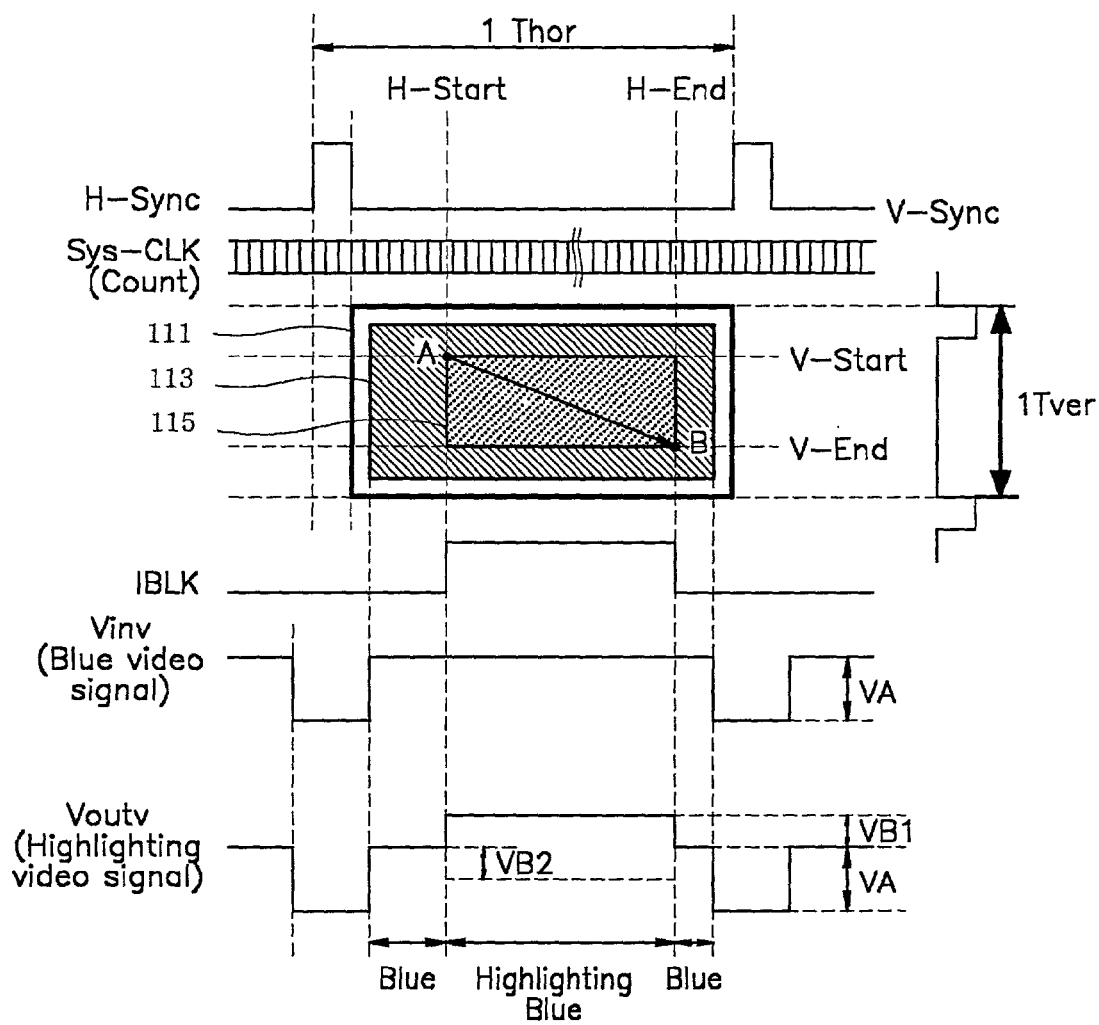
[FIG. 11] a timing diagram showing highlighting of a partial region when the entire screen of a color display tube (CDT) is displayed in blue

[FIG. 12] a timing diagram showing highlighting of a partial region when the entire screen of a CDT is displayed in white
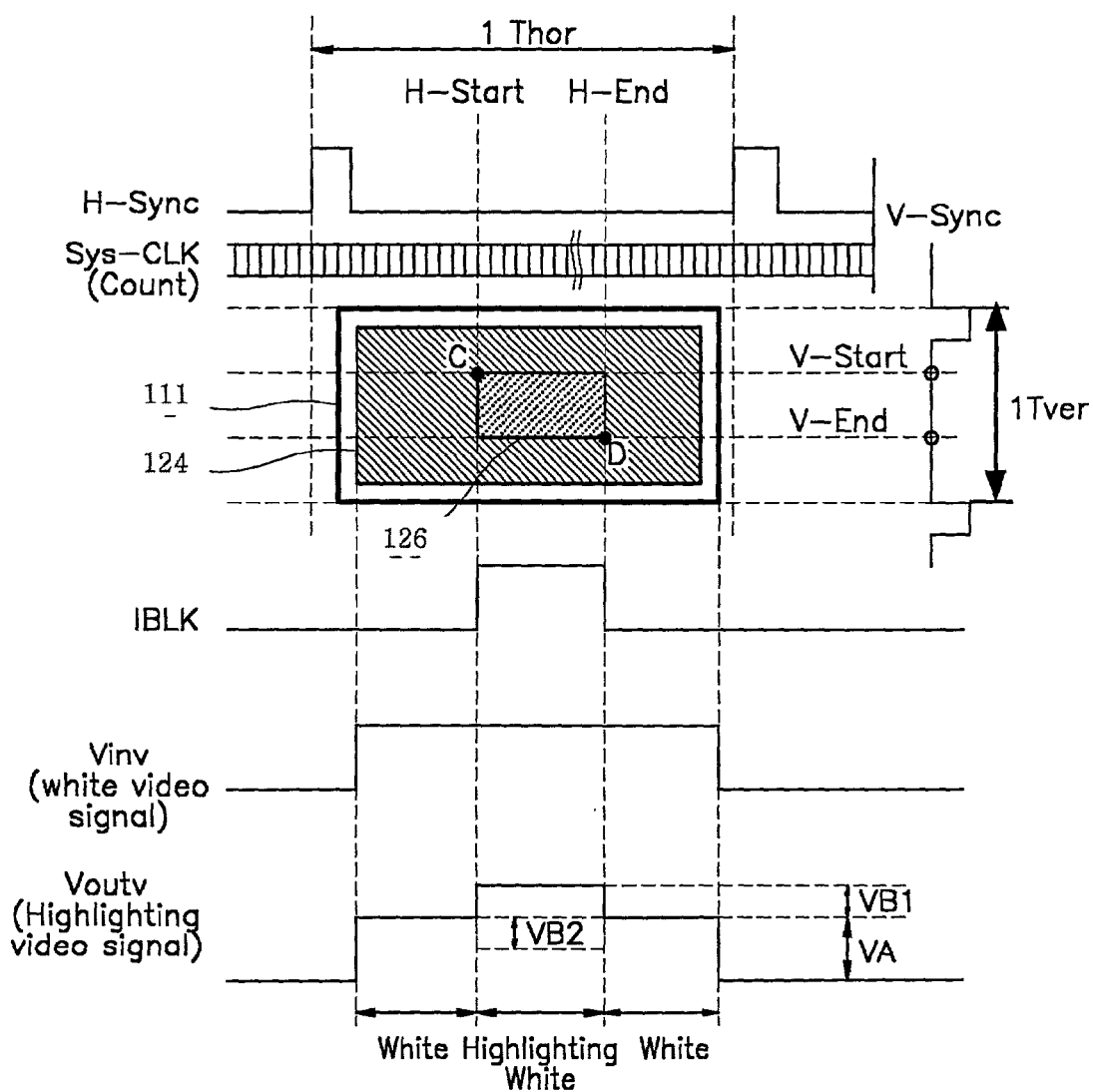

[FIG. 13] a block diagram of a contrast and sharpness adjusting apparatus
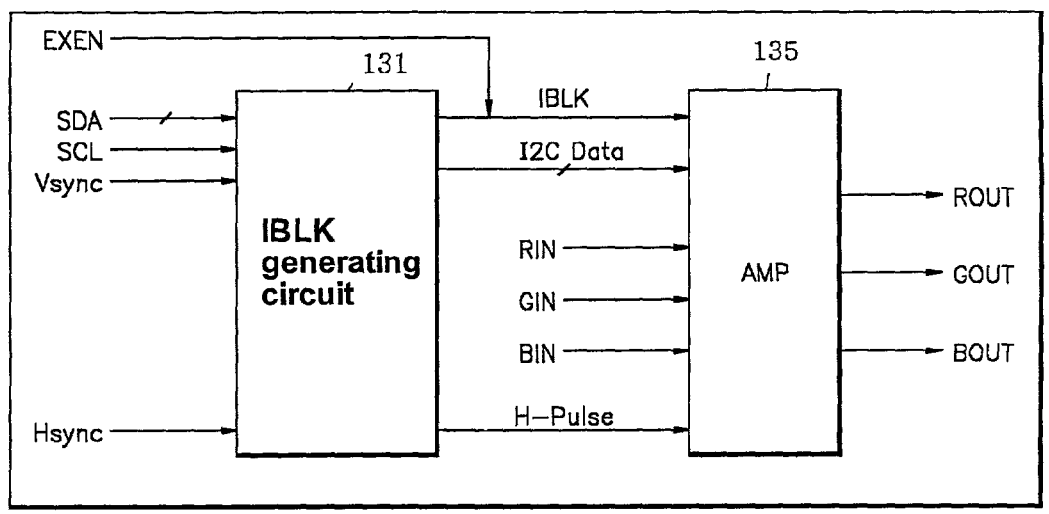
[FIG. 14] a block diagram of the highlighting enable signal (IBLK) generating circuit in FIG. 13
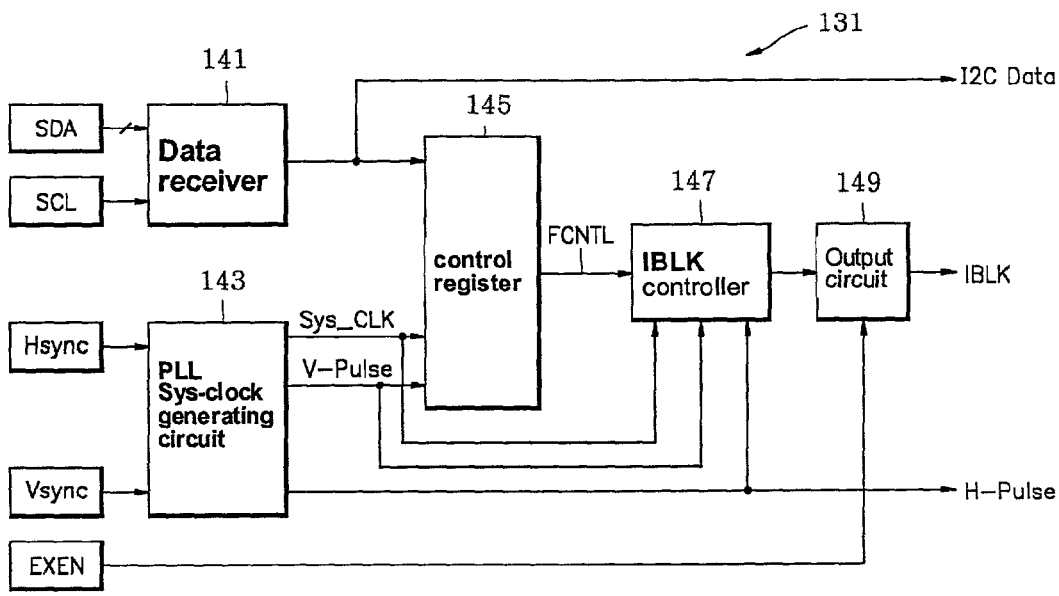

[FIG. 15] a block diagram of an amp in FIG. 13
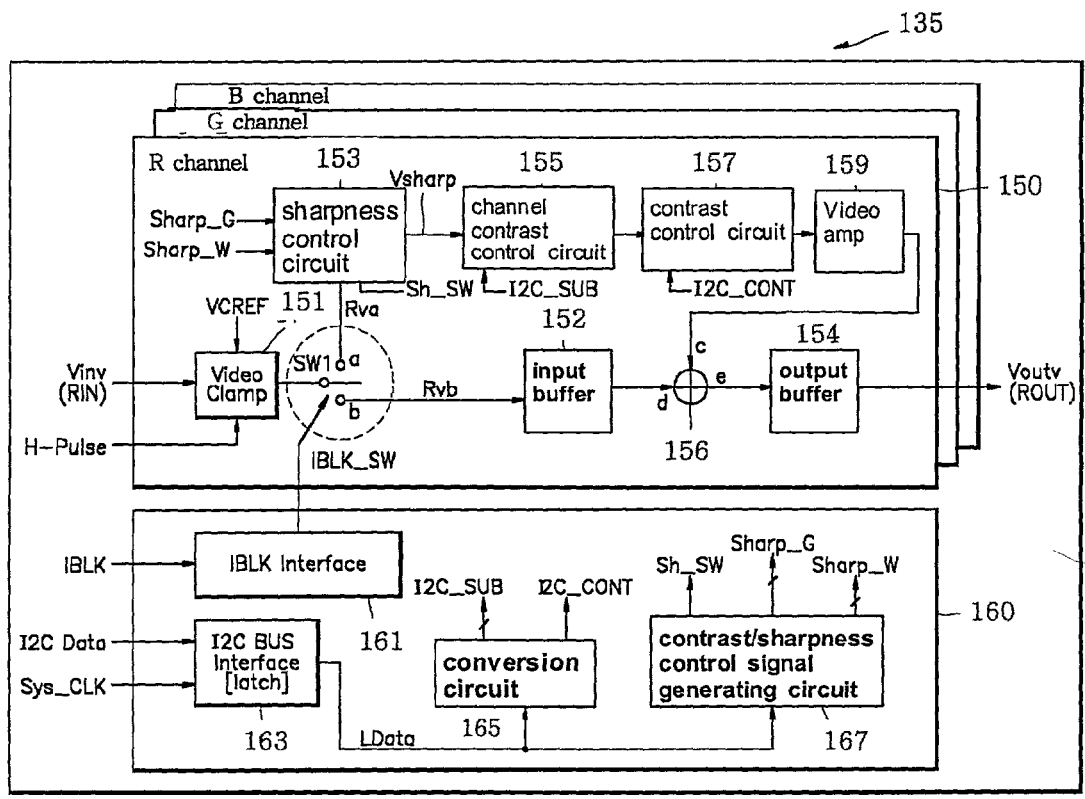
[FIG. 16] a circuit diagram of the IBLK interface in FIG. 15
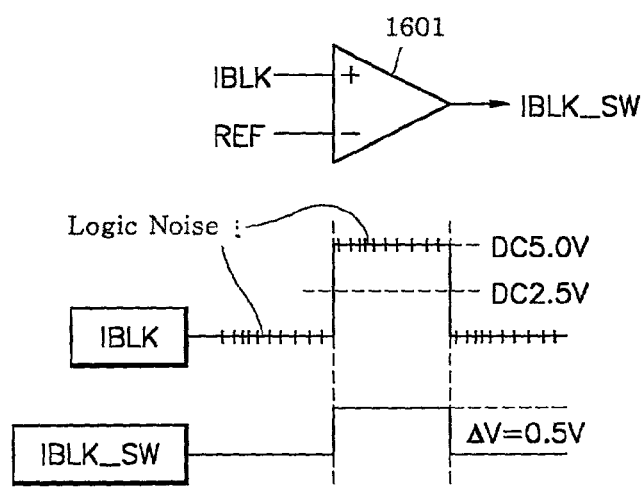

[FIG. 17] a converting circuit in FIG. 15
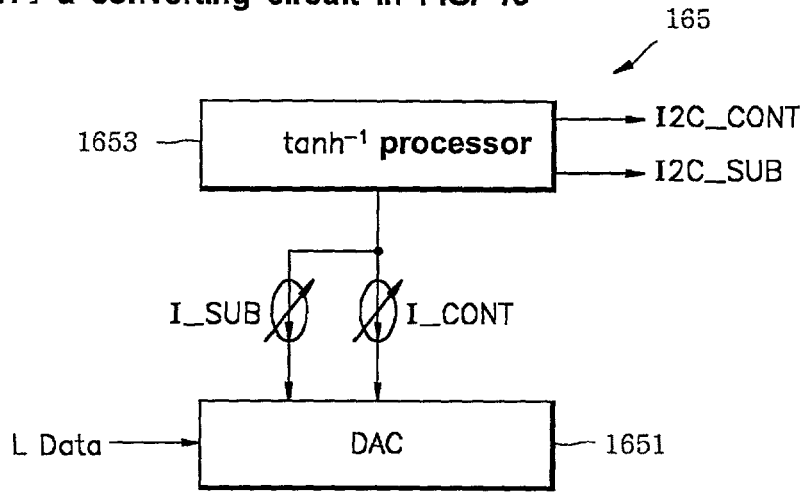
[FIG. 18] a sharpness control circuit and the output signal of the sharpness control circuit in FIG. 13
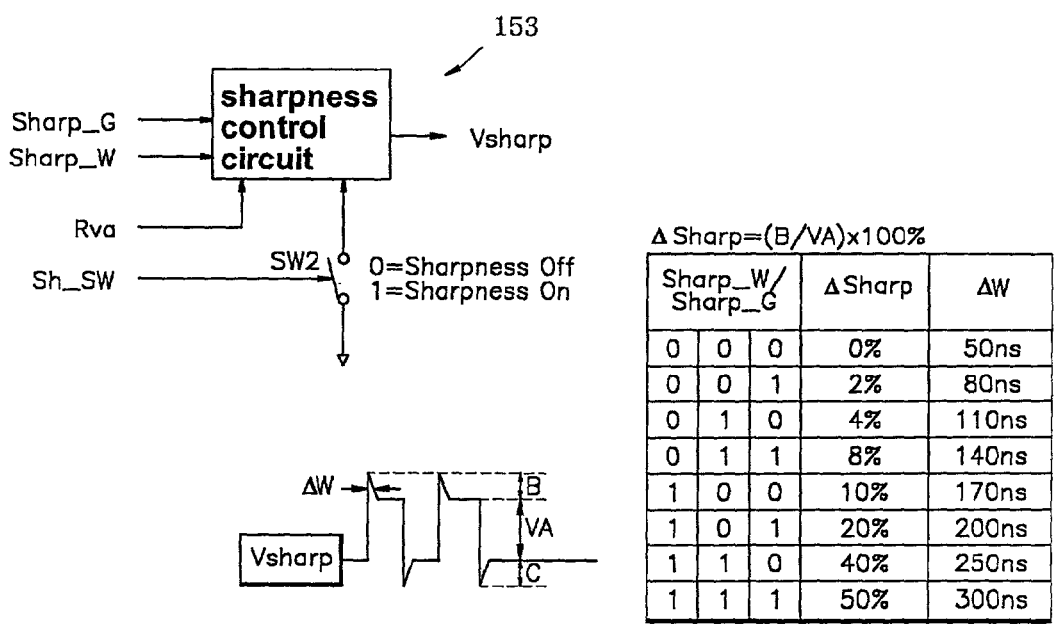
ΔSharp=(B/VA)×100%
| Sharp_W/ Sharp_G | | | ΔSharp | ΔW |
|---|---|---|---|---|
| 0 | 0 | 0 | 0% | 50ns |
| 0 | 0 | 1 | 2% | 80ns |
| 0 | 1 | 0 | 4% | 110ns |
| 0 | 1 | 1 | 8% | 140ns |
| 1 | 0 | 0 | 10% | 170ns |
| 1 | 0 | 1 | 20% | 200ns |
| 1 | 1 | 0 | 40% | 250ns |
| 1 | 1 | 1 | 50% | 300ns |

[FIG. 19] a timing diagram showing output waveforms of each circuit during an interval when a highlighting enable signal is activated
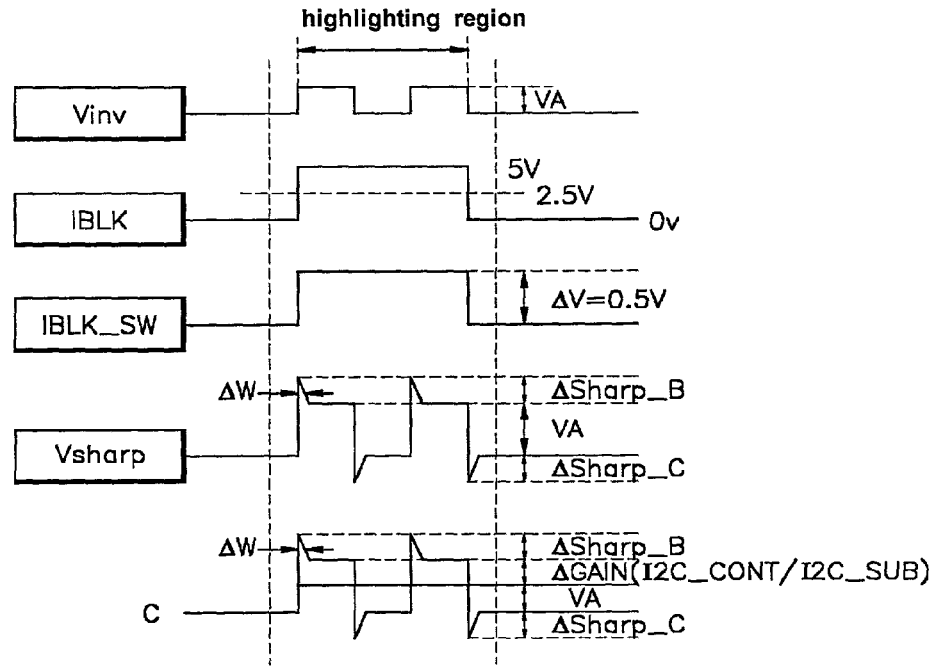
[FIG. 20] a timing diagram showing output waveforms of an amp according to an embodiment of the present invention
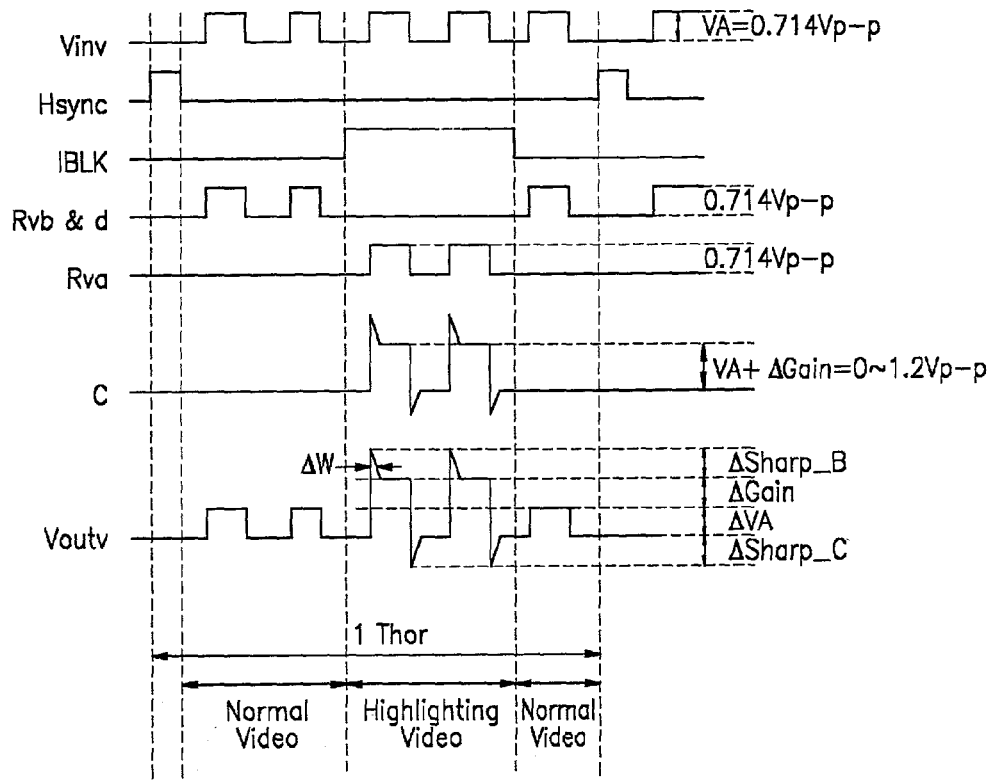

[FIG. 21] a captured photograph for the moving image in which a region to be selected is highlighted .
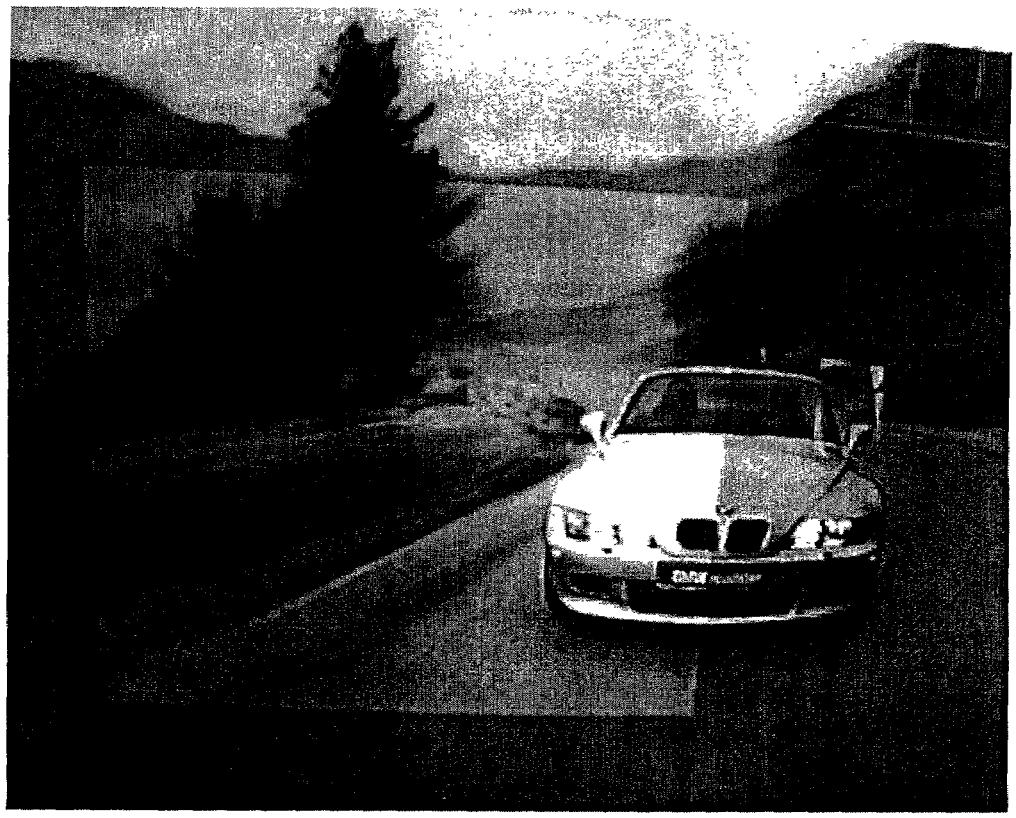

METHOD AND APPARATUS FOR ADJUSTING CONTRAST AND SHARPNESS FOR REGIONS IN A DISPLAY DEVICE

BACKGROUND OF THE INVENTION

1. Field of the Invention

The present invention relates to a computer system and more particularly to a method for setting a region of a monitor screen and controlling the contrast and sharpness of the set region. Another aspect of the invention relates to a system for transmitting information about the selected region from a computer to a display device.

2. Description of the Related Art

In general, a television is designed to display moving images while a computer monitor is designed for displaying text images. The contents of various multimedia data may include text, photographs, moving images, and games. Sharpness refers to how clear or distinct the outline of an object is displayed on a display device. A conventional computer monitor is designed to display text images with lower contrast and sharpness than a television screen. Thus, computer monitors do not optimally display moving images.

FIG. 1 shows a conventional computer system including a video signal generating source 1, a preamp 3, a main amp 5, and a Color Display Tube (CDT) 7. The CDT 7 can be any type of display device including Thin Film Transistor-Liquid Crystal Displays (TFT-LCD) and Plasma Display Panels (PDP). The CDT 7 represents a display device that displays the video signals received from a computer site. The video signal generating source 1 at the computer site outputs video signals, i.e., red, green, and blue (R/G/B) signals to a monitor site. The pre-amp 3 receives and amplifies the input R/G/B signals and the main amp 5 amplifies the output signals from the pre-amp 3.

The conventional computer system shown in FIG. 1 cannot properly adjust contrast and sharpness for regions of the display showing moving images. For example, the CDT 7 has normally displayed text on the screen. The text does not require the same contrast and sharpness required for moving images. To clearly show moving images on the CDT 7, the contrast and sharpness often need to be increased. However, the CDT 7 can be physically damaged if the contrast and sharpness of the images are too high. Thus, the conventional CDT 7 does not provide the enhanced sharpness and necessary clarity for effectively displaying moving images.

The present invention addresses this and other problems associated with the prior art.

SUMMARY OF THE INVENTION

A partial region on a screen can be selected for highlighting. Information related to the partial region is transmitted from a computer to a computer monitor. In one embodiment, the partial region information is sent over a different port from the one used to send video data. The image processor adjusts contrast and sharpness of the partial region according to the partial region information. Adjustments are made for differences in coordinate system or resolution between the computer site and the display device. The partial region can be selected from the computer or from a user interface on the computer monitor. Selected partial regions can be moved in conjunction with movements of windows containing the image. Highlighted selected regions can also be automatically disabled when the window is deactivated.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 1 is a block diagram of a conventional computer system.

FIG. 2 is a block diagram of a computer system that includes contrast and sharpness circuitry.

FIG. 3 is a detailed block diagram of the computer system about control flow and information path shown in FIG. 2.

FIG. 4 is a block diagram of a contrast and sharpness adjusting system.

FIG. 5 is a flow diagram showing how a partial region is selected using an on screen display.

FIG. 6A is a block diagram showing how a computer site sends some information to monitor by using S/W.

FIG. 7 is a drawing showing how a non-rectangular region is set by an external enable signal.

FIG. 8 is a timing diagram showing how error compensation is performed using a two-stage Phase Locked Loop (PLL).

FIG. 9 is a timing diagram showing error compensation using a horizontal synchronization signal and the active video signal detected by IVP.

FIG. 10 is a timing diagram showing error compensation using some information from a graphic card and an active video signal.

FIG. 11 is a timing diagram showing highlighting of a partial region when the entire screen is displayed in blue.

FIG. 12 is a timing diagram showing highlighting of a partial region when the entire screen is displayed in white.

FIG. 13 is a block diagram of a contrast and sharpness adjusting circuit.

FIG. 14 is a block diagram of the highlighting enable signal generating circuit in FIG. 13.

FIG. 15 is a block diagram of an amplifier circuit in FIG. 13.

FIG. 16 is a circuit diagram of an IBLK interface circuit shown in FIG. 15.

FIG. 17 shows a converting circuit shown in FIG. 15.

FIG. 18 shows a sharpness control circuit from FIG. 13 and an output signal from the sharpness control circuit.

FIG. 19 is timing diagrams for output waveforms when a highlighting enable signal is activated.

FIG. 20 is timing diagrams for output waveforms of an amplifier when the highlighting enable signal is activated.

FIG. 21 is a photograph of a moving image with a highlighted selected region.

DETAILED DESCRIPTION OF THE INVENTION

Figure 6B:
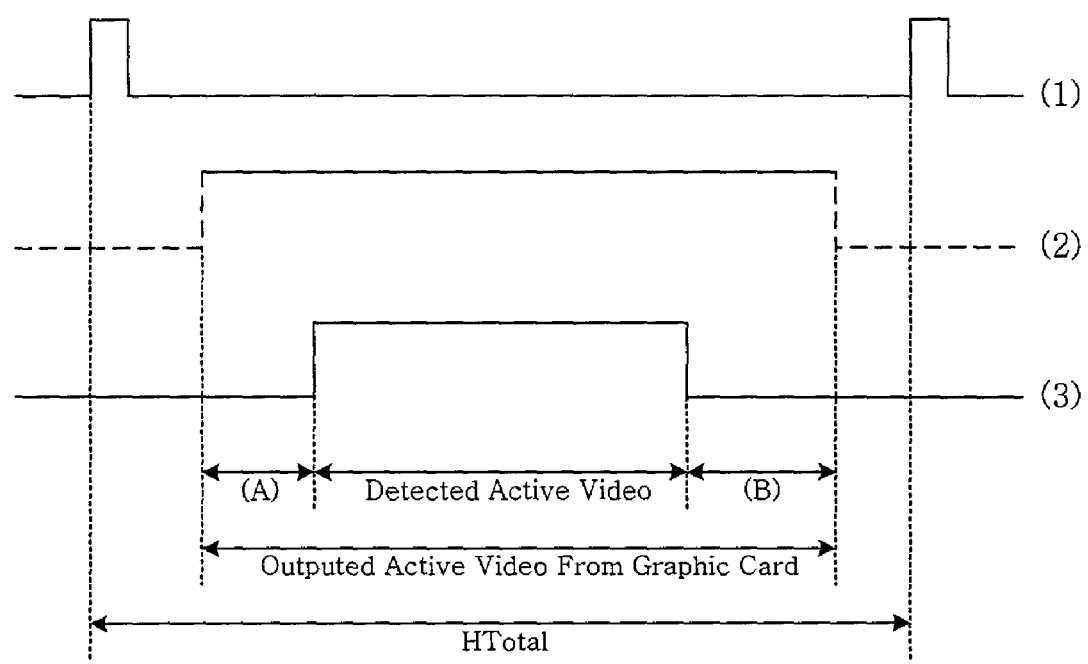
FIG. 6B is a timing diagram explaining exception processing.

FIG. 2 is a block diagram of a system according to one embodiment of the present invention. A computer includes a video signal-generating source 1. A monitor includes an Image View Processor (IVP) 27, a pre-amp 3, a main amp 5, and a color display tube (CDT) 7. The video signal-generating source 1 outputs a video signal Vinv to the monitor that includes red, green, and blue (R/G/B) signals. The IVP 27 adjusts contrast and sharpness for selected regions of the Vinv signal.

A user-selected region displayed on a computer monitor is alternatively referred to as a "partial region". Computer generated information related to the selected region is referred to as "region information" or "position information". Information relating to adjustment of the contrast and sharpness of the partial region is referred to as "adjustment information". The IVP 27 alters the video signal level of the Vinv signal according to the region, position, and adjustment information.

A peripheral circuit attached to the computer, such as a mouse or hot-key, generates position data representing the upper left and lower right coordinates of the partial region. The computer generates the region information representing the size of the partial region set by the position information. The R/G/B signals (Vinv), and the position, region and adjustment information are transmitted to the IVP 27 through a predetermined interface. The predetermined interface may be a serial port, a parallel port, a USB port, etc.

The Vinv signal may be transmitted to the IVP 27 through one interface and the position, region and adjustment information may be transmitted to the IVP 27 over the same or a different interface. The IVP 27 receives the Vinv signals and increases or decreases the gain corresponding to the position, region, and adjustment information and outputs a video signal Voutv to the pre-amp 3. The IVP 27 converts the position and the region information according the resolution of the CDT 7.

The contrast and sharpness of the partial region is increased when the gain of the R/G/B video signals Vinv are increased. The contrast and sharpness of the partial region is decreased when the gain of the R/G/B video signals Vinv are decreased.

The pre-amp 3 amplifies the R/G/B video signals Voutv thus adjusting the contrast and sharpness of the partial region. The main amp 5 receives and amplifies the output signal of the pre-amp 3. The CDT 7 is a display device that displays the video signals received from the main amp 5.

FIG. 3 is a more detailed block diagram of the computer system 100 shown in FIG. 2. The computer system 100 includes a computer 10 and a monitor 20. The computer 10 includes an input device 11, such as a mouse, software (S/W) 13 for setting the partial region and providing a user interface, and a Universal Serial Bus (USB) interface 15 for transmitting position information generated by the S/W 13 to the monitor 20. An operating system (O/S) 17 controls and manages the computer 10. A graphic card (G/C) 19 outputs graphic data from a CPU (not shown) in the computer 10 for displaying on the monitor site 20.

The monitor 20 includes a USB interface 21, a Main Control Unit (MCU) 25, an On Screen Display (OSD) 23, and the IVP 27. The USB interfaces 15 and 21 in one embodiment are serial port or plug-and-play interfaces typically used between the computer 10 and different peripheral devices such as audio players, joysticks, keyboards, telephones, scanners, or printers. Any interface can be used for transmitting signals between the computer 10 and the monitor 20 such as serial ports, parallel ports, optical fiber ports, USB ports, etc.

The USB 21 is electrically coupled to the USB 15 for transmitting region information generated by the computer 10 to the MCU 25. The MCU 25 controls operation of the IVP 27 in response to the signals received from the USB 21 or from signals received from the OSD 23. The IVP 27 adjusts the contrast and sharpness for the region selected by the user according to the signal output from the MCU 25. The interface used for transmitting the R/G/B video signals to the IVP 27 may be the same USB interface 15 used for transmitting the region information and adjustment information or the video signals may be transmitted over a different interface.

The IVP 27 receives the R/G/B video signals output from the G/C 19 and increases or decreases the contrast and sharpness of the partial region corresponding to the position information and the region information. This is alternatively referred to as "highlighting". The OSD 23 can also be used for adjusting the light and dark images or characters on a screen, the brightness of the background regions of an image, and adjusting the size of the screen by using ZOOM OUT or ZOOM IN commands.

If the user manually selects the partial region using the OSD 23, the MCU 25 transmits region information set by the OSD 23 to the IVP 27. The IVP 27 then adjusts the contrast and sharpness of the selected partial region.

The partial region can also be selected using the S/W 13 in the computer 10. The selected region information and image adjustment information is transmitted from the computer 10 to the monitor 20 over USBs 15 and 21. The S/W 13 receives a message generated by the O/S 17. For example, the S/W 13 obtains region information selected by a mouse 11 by the user pointing and clicking on different locations on the monitor screen. The S/W 13 also receives current setting information for the monitor 20 from the G/C 19.

The S/W 13 compensates for any error due to some differences in a coordinate system or resolution differences between the computer 10 and the monitor 20 and outputs the error compensated region information and adjustment information over USB interface 15.

The MCU 25 formats the output signal from the USB 21 using the I2C protocol and outputs the result to the IVP 27. The IVP 27 then adjusts the video signals output from the G/C 19 for the selected partial region according to the region information and the adjustment information. For example, the IVP 27 increases or decreases the contrast and sharpness of the identified partial region.

FIG. 4 is a block diagram showing a contrast and sharpness unit in the IVP 27 that includes a region-setting unit 41 and a highlighting adjusting unit 43. The region-setting unit 41 includes a region information and adjustment information register 42 for storing information concerning the size, position, contrast, and sharpness for the partial region selected by the user.

The region-setting unit 41 outputs the region information and the adjustment information for the partial region to the highlighting adjusting unit 43. The highlighting adjusting unit 43 adjusts the contrast and sharpness of the partial region into a level designated by the user. Errors in the region information are compensated by the highlighting adjusting unit 43 in response to a data signal SDA and a clock signal SCL, or according to an external enable signal EXEN. The SDA and SCL signals can be transmitted from the MCU 25 to the IVP 27 using an I2C protocol.

The external enable signal EXEN is generated by the MCU 25 in response to the signals generated by the S/W 13 or the OSD 23. The external enable signal EXEN is used for selecting a non-rectangular shaped partial region.

Region Selection Using the On-Screen Display

FIG. 5 shows how a partial region is selected using the On Screen Display (OSD) 23 independently of the computer 10. In block 50, the user starts the process of setting a partial region. In block 51, a default window having a predetermined size is output at a predetermined position. Box 52 determines whether the default window output in box 51 is the same as the region desired by the user. This is determined by the user activating a button or other user interface on the OSD 23. If the default window is the region desired by the user in block 52, the current window is set as the default window in box 57 and region setting is finished in block 58.

If the default window is not the region desired by the user in block 52, the output window is automatically moved to a different position in box 53. If the moved window is the same as the region desired by the user in block 54, the new moved window is set as the default window in block 57 and region setting is finished in block 58. The moved window is identified as the desired location when the user activates a signal generating input, such as a button, on the on-screen display.

If the size of the moved window is not the same as what is desired by the user, the size of the moved window is automatically adjusted in block 55. For example, the user may press another button when a predetermined window is not desired. Alternatively, the on-screen display waits a predetermined amount of time. If the user does not press any button within that predetermined time period, the default window is moved to a new location or possibly changed to a new size.

If the adjusted window is not the same as the desired region in block 56, processing returns to block 52 to repeat the process in blocks 52–58. The final region information and the image adjustment information determined in FIG. 5 are transmitted to the IVP 27 through the MCU 25. The IVP 27 then highlights the identified region.

Region Selection Using the Computer

FIG. 6A is a diagram showing how region information and adjustment information for the selected partial region is set by the S/W 13 and then sent to the IVP 27. The S/W 13 generates and then outputs the region information and adjustment information to the USB 15. The USB 15 transmits the region information and adjustment information through the USB 21 to the MCU 25. The MCU 25 converts the region information and adjustment information into an Inter-IC (I2C) protocol and then outputs the result to the IVP 27.

The IVP 27 highlights the partial region according to the information generated by the S/W 13. That is, the IVP 27 receives the video signals, the region information and the adjustment information and adjusts contrast and sharpness corresponding to the region information and the adjustment information.

The S/W 13 receives a message from the O/S 17 related to the point and click locations for the mouse 11 (FIG. 3). The S/W 13 sets a partial region desired by the user according to the mouse inputs. The type of region selected may be a window, object, full screen, or any area either manually set by the user with a mouse or set by an auto-selection process. The window denotes an area of top-most window positioned mouse point. The object denotes an area of bottom most window positioned mouse point. The region typically has a rectangular shape, but if an external enable signal is used as described below, the region may have a shape other than a rectangle, such as a circular or polygonal shape.

Auto-Selection

Auto-selection automatically selects a partial region in which moving images are displayed. Auto-selection prevents possible damage to the CDT 7 (FIG. 2) that could be caused by the user erroneously selecting a region where text is displayed. One application for auto-selection is video games where an entire screen needs to be highlighted for moving images.

The S/W 13 searches a windows system file such as a registry, window initialization (Win.ini), or system initialization (System.ini). A window refers to the area from the uppermost position to the lowermost position in which the mouse can be positioned. The S/W 13 obtains a window handle, for example, for a currently operating video game and the size of a window corresponding to the window handle. The S/W 13 then hooks some predetermined message (activation, sizing, moving, etc) for the window handle and the window size. After having set the desired region, the S/W 13 transmits position data and region information representing the upper left and lower right coordinates of the partial region to the IVP 27 through the USBs 15 and 21. Predetermined contrast and sharpness information are then automatically set for the partial region where the moving images are displayed. The IVP 27 highlights the partial region on the monitor site 20.

Exception Processing

A partial region can be manually selected by the user using the mouse 11 in FIG. 3. The partial region is not highlighted until a program in the window corresponding to the partial region is activated. That is, the selected partial region is highlighted only when the program running in the window is activated. For example, the highlighted partial region may be in a window that is minimized. In another example, another program is activated in a different window that does not contain the highlighted partial region. The partial region is highlighted only when the program or window containing the partial region is activated. The S/W 13 obtains a window handle for the current pointer and then hooks a message for activation or deactivation of a predetermined program generated by the O/S 17.

A user can set a second partial region for highlighting within the first selected partial region. The size of the second partial region is adjusted so that its size is not greater than that of the first partial region even if the second partial region is highlighted with a greater size.

If the level of the video signals, i.e., R/G/B signals is 0V, a partial region cannot be set on the monitor site 20. This problem is solved by obtaining the start position of the active video signals generated in the G/C 19, setting the partial region (conjugation of the partial region), and highlighting the partial region.

FIG. 6B explains this exception processing in more detail. Number 1 refers to an Hsync signal, number 2 refers to an active video signal, and number 3 refers to an active video signal detected from a R/G/B OR operation. The sections identified as A and B refer to an undetected active video area at the G/C (Graphic Card) 19 (FIG. 3). The active video signal is undetected in sections A and B because the R/G/B video level has a 0 or very small signal level at those locations. At this time, the appropriate Hres cannot be guaranteed at FIG. 9. and is referred to as an exception situation.

In exception situation processing Hstart is calculated by not using the active video signal detected from a IVP IC. Conversely, video timing information from the G/C 19 is used and the user's selected area (region) is 19 is searched using a proportional expression described in FIG. 10.

If the frequency or horizontal resolution of the G/C 19 is changed by user selection or by software, the size of the highlighted partial region is automatically altered in response to the variable frequency or horizontal resolution of the G/C 19. For example, the upper left coordinates (sx, sy) and lower right coordinates (ex, ey) may be set to (100, 100) and (200, 200), respectively at a horizontal resolution 1280. If the horizontal resolution is changed to 800, the changed upper left coordinates (sx', sy') and lower right coordinates (ex', ey') are obtained according to Equation (1):

$$1280:100=800: sx' \quad (1)$$

An sx' value of 62.5 is obtained from Equation (1). The sx' value obtained from Equation (1) has an error of less than one pixel if the information is an integer. The upper left coordinates (sx', sy') and the lower right coordinates (ex', ey') are calculated according to Equation (1).

In the case of new frequency or horizontal resolution values, the S/W 12 receives a horizontal resolution change message from a Windows system to change the size of the partial region. The S/W 13 determines a distance from a predetermined start position where the video signals are activated and an enable interval according to the video signals output from the G/C 19. The S/W 13 determines the distance and enable interval independently of a width of a horizontal synchronizing signal, a back porch, and a left border.

Figure 6C:
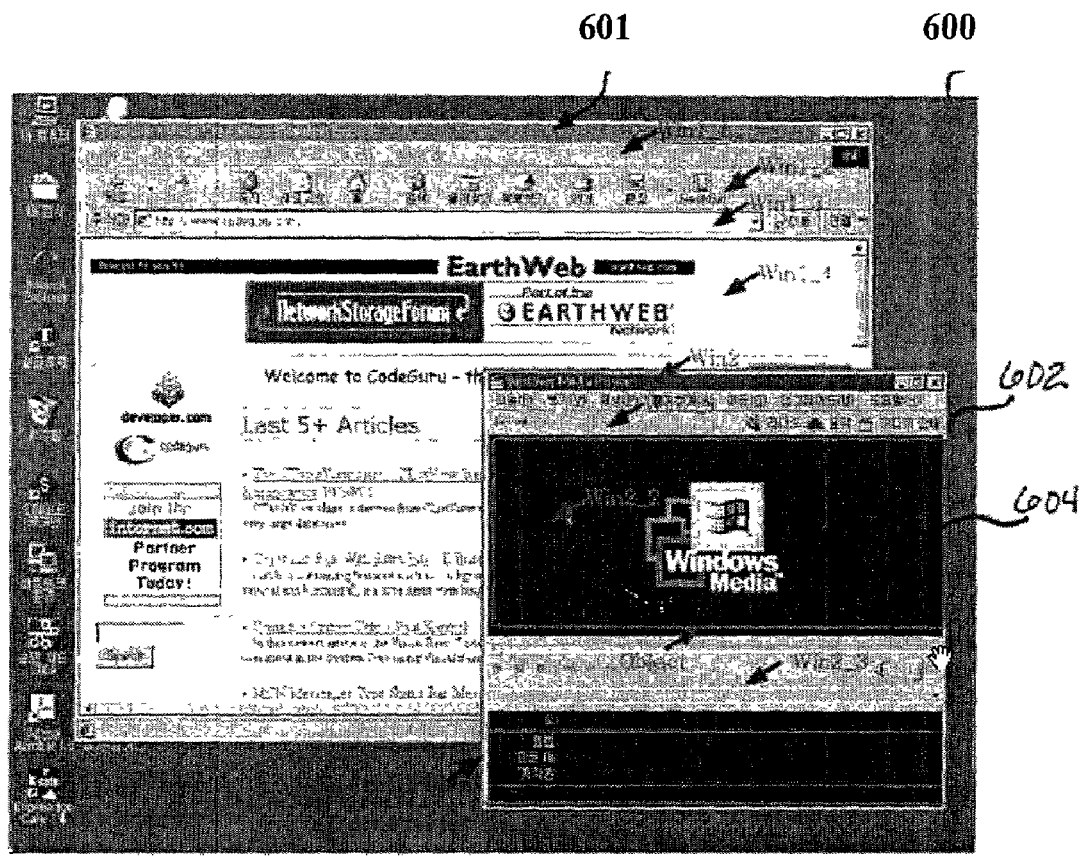
FIG. 6C is a drawing showing different windows on a computer screen.

FIGS. 6C–6G give examples of how partial region information is generated and processed. FIG. 6C shows a display screen 600 containing windows 601 and 602. There are objects 604 within the windows.

Figure 6D:
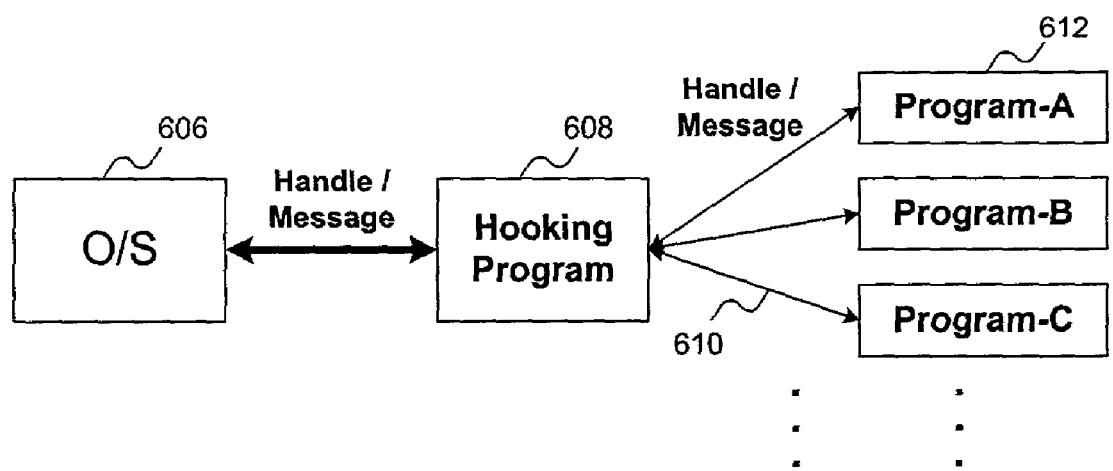
FIG. 6D is a block diagram showing how messages are processed by a hooking program.

In FIG. 6D, a software (S/W) hooking program 608 looks for handles and messages 610 transmitted between the computer O/S 606 and programs 612. If an area is selected by user for highlighting, O/S 606 generates the window handle and the message 610 that contains the current coordinates for the selected area.

If the window handle and message 610 change (the highlighted area changes), the hooking program 608 extracts information about window size and moving distance from the O/S 606. Coordinates for the highlighted area are calculated relevant to the moved or resized window. A selected area is identified as a relative distance based on upper left coordinates of the relevant window.

The relevant handle for a window is calculated and stored, when the window is activated by the hooking program 608. The highlighted area is then set again according to the horizontal and vertical direction of the new calculated upper left coordinates.

Figure 6E:
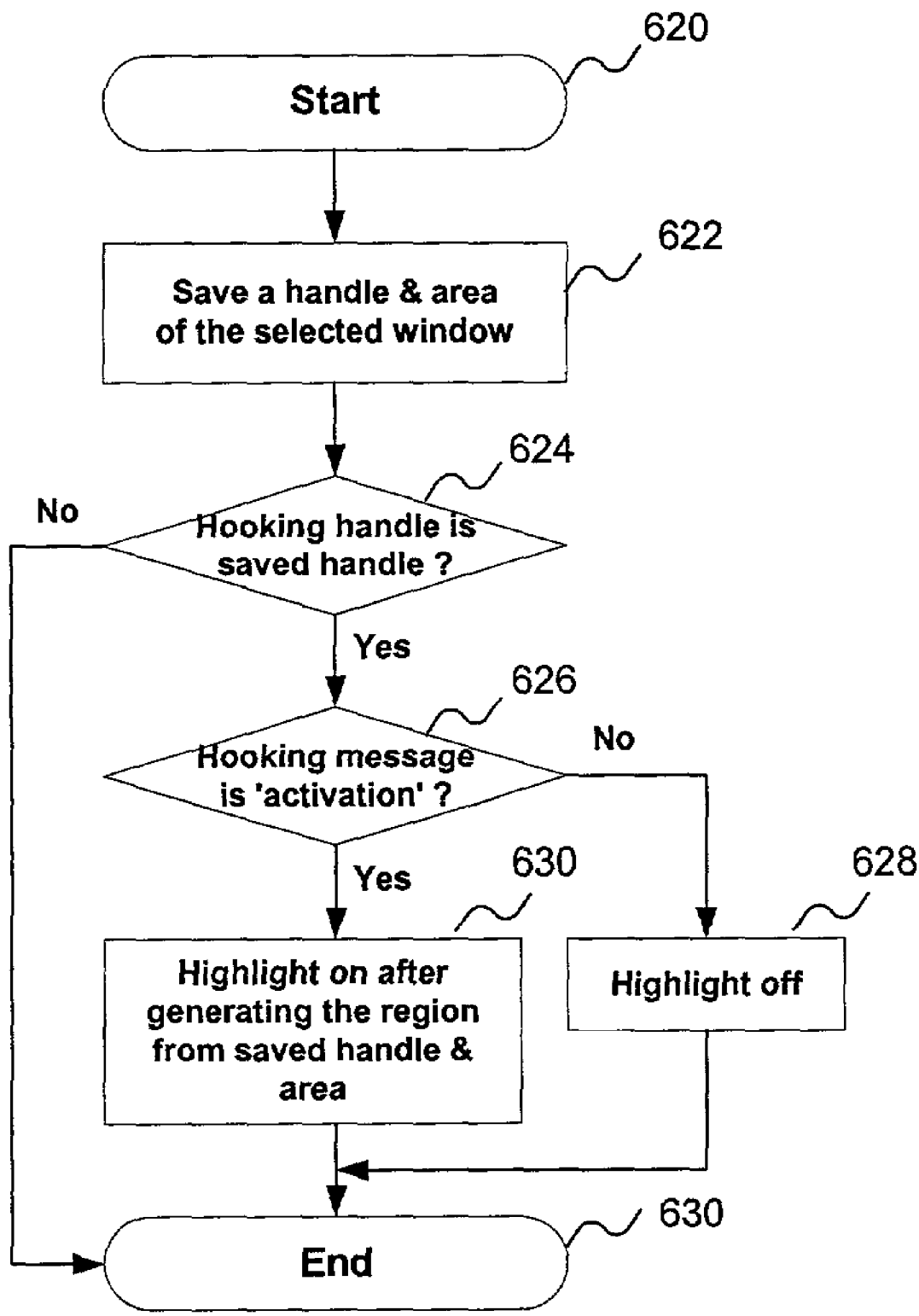
FIG. 6E is a flow diagram showing in further detail how the hooking program in FIG. 6D operates.

FIG. 6E is a flow chart explaining in more detail the operation of the hooking program in FIG. 6D. The hooking program 608 saves a handle and area for the selected window in block 622. If the hooking handle does not need to be saved in decision block 624, then the hooking program ends in block 630.

If the hooking handle needs to be saved in decision block 624, then the hooking program determines if the hooking message indicates window activation in decision block 626. If the hooking message indicates that the window is not activated, the highlighted area is deactivated in block 628. If the hooking message indicates window activation, then the hooking program goes to block 630. Block 630 activates the highlighted area after determining the selected region from the saved handle and area data.

Figure 6F:
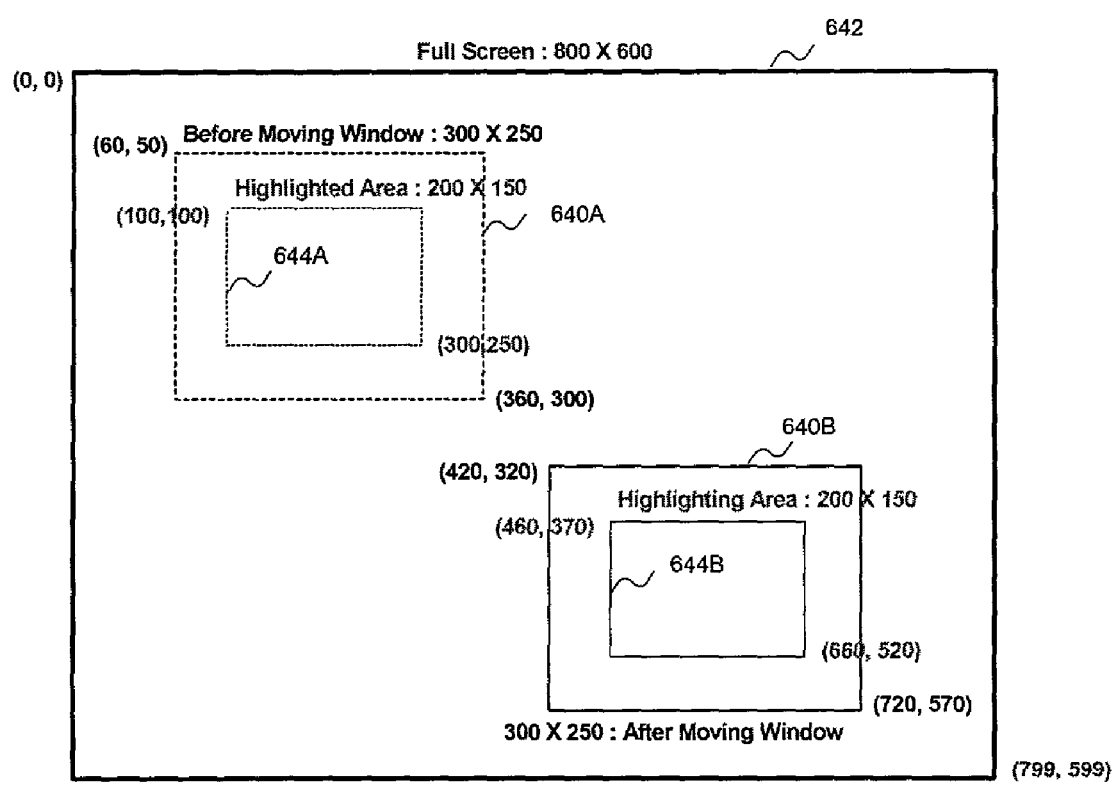
FIG. 6F is a drawing showing how the location of a selected region is changed according to changes in the location of the window containing the selected region.

FIG. 6F shows an example of how the partial area is selected and moved. In window 640A, selection of the rectangle window 640A is expressed by a dotted line. After the window 640A is moved, the moved window 640B is expressed as a solid line. A full screen 642 is 800×600 pixels. The upper left location is (60, 50) and the lower right position is (360, 300) before the window 640A is moved. The size of window 640A is 300×250 pixels. The upper left position is (100, 100) and the lower right position is (300, 250) for the highlighted area 644A in the window 640A. The highlighted area size is 200×150 pixels.

If the upper left position of moved window 640B is moved to pixel location (420, 320) and the lower right position is moved to pixel location (720, 370) and the window size is not changed, the new coordinates for the highlighted area 644B are solved as follows.

The horizontal and vertical distance from the upper left coordinates of the window 640A to the upper left coordinates of the highlighted area 644A before moving are (100−60=40,100−50=50). The horizontal and vertical distance of the lower right coordinates for the highlighted area 644A before moving are (300−100=200, 250−100=150). The size of the highlighted area 644A is 200×150.

The moved window 640B remains the same size but is moved to location (420, 320). The highlighted area 644B in the moved window 640B is derived as follows. Using the prior calculated horizontal and vertical direction distance, the new highlighted area 644B is calculated as the upper left position (420+40=460,320+50=370). The lower right position for highlighted area 644B is (460+200=660,370+150=520) because the prior size of highlighted area 644A is 200×150.

Figure 6G:
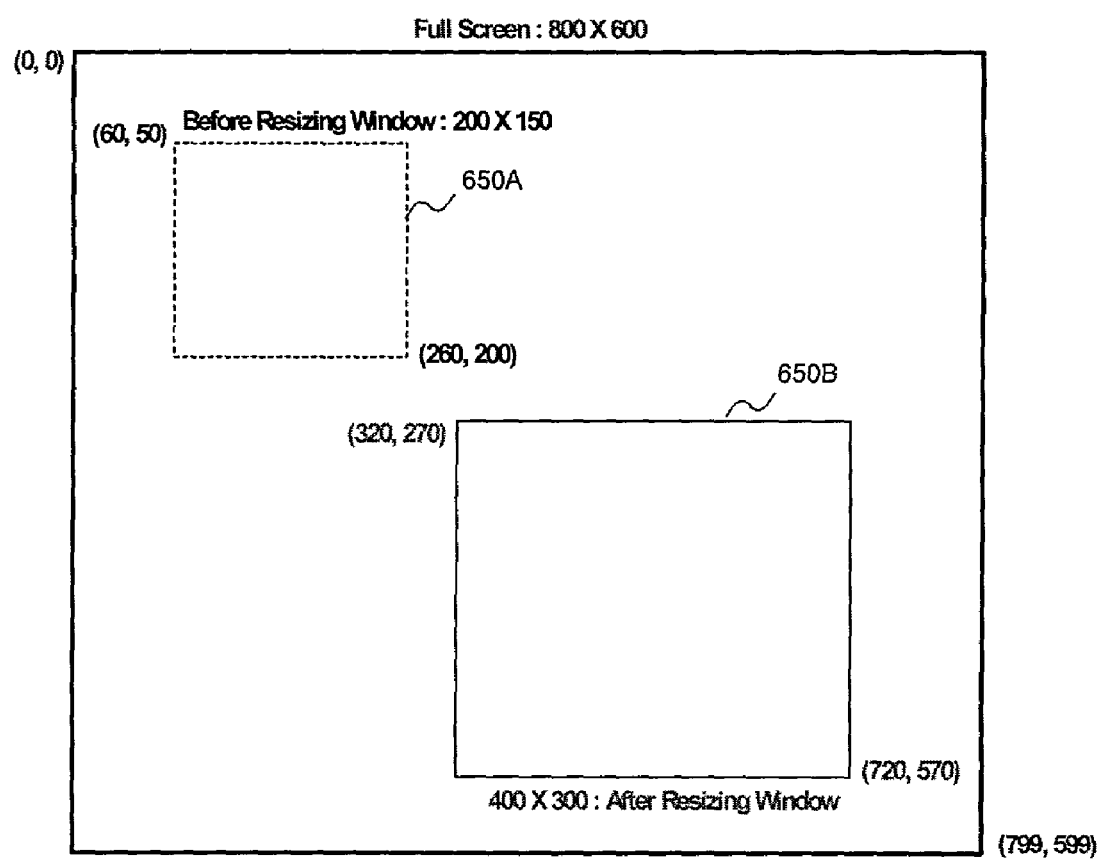
FIG. 6G is a drawing showing how a size of the selected region is changed according to changes in the size of the window containing the selected region.

FIG. 6G shows an example of how the highlighted area is calculated when a window 650A is resized. A partial area is highlighted in a window 650A by "Window Selection." The original size of the selected window 650A is expressed as "a dotted line". When the window size is changed, the changed window 650B is expressed as a solid line.

If an area in window 650A is highlighted, then that highlighted area must be recalculated for the new size of window 650B. The window handle and area for the selected window 650A is stored by the hooking program. If the window message indicates a change in the size of the window, the changed window area is calculated again to determine the size of the highlighted area.

This function can be described using at the C++program language.

GetCursorPos(&MousePoint);
hWnd=::WindowFromPoint(MousePoint);
::GetWindowRect(hWnd,m_rectSelect);

The first line identifies the position of a current mouse pointer. The second line generates the window handle for the mouse pointer. The third line solves the relevant window area using the window handle. The third line is expressed as the upper left/lower right $(x_L, y_T)$, $(x_R, y_B)$ type.

Non-Rectangular Regions

FIG. 7 is a diagram showing how a region having a non-rectangular shape is selected using an external enable signal. A region set by the S/W 13 typically has a rectangular shape. In this case, region information and adjustment information contained in register block 42 (FIG. 4) of the IVP 27 are set to highlight the rectangular region. If the region set by the S/W 13 is not rectangular, region information for various shapes is transmitted to the IVP 27 using an external enable signal EXEN.

For example, in FIG. 7, a circular partial region A is selected for highlighting. An external signal EXEN_1 is activated at a start point SA and deactivated at an end point EA of the circle A to be highlighted. An external enable signal EXEN_N is activated at a start point SB and deactivated at an end point EB on the circle A. An external enable signal EXEN_2N is activated at a start point SC of the circle and deactivated at an end point EC.

Referring to FIGS. 6 and 7, the external enable signals EXEN_1–EXEN_2N are generated for horizontal rows of pixels in the partial region A to be highlighted and scanned on the monitor site 20. The partial region A is then displayed on the monitor site 20 and highlighted by the IVP 27. The external enable signals EXEN_1–EXEN_2N are synchronized with the horizontal synchronizing signal Hsync. A full screen is generated on the monitor site 20 during an interval when the horizontal synchronizing signal Hsync is activated. The MCU 25 detects the horizontal synchronizing signal Hsync and converts the horizontal synchronizing signal Hsync to a time domain. The MCU 25 sets a distance from the horizontal synchronizing signal Hsync to a start point of an interval to be enabled. The MCU 25 then enables the external enable signals EXEN_1–EXEN_2N starting from their start points to their end points.

For an enable interval in a vertical axis direction, a line distance is set from a vertical synchronizing signal. In this case, the S/W 13 transmits region information about each line to the MCU 25 within the period of the horizontal synchronizing signal Hsync. The MCU 25 processes information transmitted from the S/W 13 every period of each horizontal synchronizing signal Hsync. The S/W 13 generates horizontal resolution of the active video signals among the current setting information from the G/C 19 and region information about a partial region at the active video resolution. That is, the region information is generated with respect to an interval during which the video signals are activated.

Compensating for Errors

Errors may occur due to differences of the coordinate systems between the computer site 10 and the monitor site 20. The IVP 27 may generate a partial region based on the horizontal synchronizing signal Hsync. An error may be generated between the region information generated by the S/W 13 and the region information used in the IVP 27. The error is caused by differences in the basis of coordinate and horizontal resolution, etc.

A PLL of the IVP 27 is difficult to be made symmetrically in a pixel unit because video resolution generating in the PC site is diverse. So, generally the PLL of the IVP 27 is designed to set up a number for Mode.

For example, mode selection horizontal resolution of the IVP 27 may be selected among 640, 800, 1,024, and 1,280 pixels. However, horizontal resolution of the active video signals may be 720, 832, 1,152, and 1,600. The IVP 27 would generate an error for horizontal resolutions that cannot be selected, such as 720, 832, 1152, and 1,600. When the computer site 10 and the monitor site 20 have different horizontal resolutions, coordinates of the mouse 11 (i.e., mouse pointer) selected on the computer site 10 are different from those displayed on the monitor site 20.

FIG. 8 is a timing diagram showing how error compensation is performed using a two-stage phase-locked loop (PLL). The IVP 27 performs an OR operation on the R/G/B active video signals to generate a video enable signal at a determined threshold voltage level. A system clock signal is generated using a PLL (not shown) in the IVP 27. The PLL divides an interval between a first rising edge of the horizontal synchronizing signal Hsync and a second rising edge according to a mode selection horizontal resolution as shown by the first signal in FIG. 8. A two-stage PLL (not shown) according to the present invention divides an interval from a rising edge of the active video signal to a falling edge according to the mode selection horizontal resolution as shown by the bottom signal in FIG. 8. Errors are eliminated because the same reference signals are used by the two-stage PLL, the active video signals and the region information transmitted from the S/W 13.

The S/W 13 compensates for errors using Equation (2). In FIG. 8, HRes denotes a horizontal resolution of active video signals output by the G/C 19 (FIG. 3) and MousePos denotes the actual coordinates of the mouse 11 (mouse pointer) determined at the computer site 10. Mode denotes a horizontal resolution determined by the two-stage PLL in the IVP 27 and x denotes coordinates displayed on the CDT 7 derived for the actual mouse pointer coordinates MousePos. The value x is derived in the IVP 27 as follows.

Hres: MousePos=Mode: x $$x = MousePos \times Mode / HRes \qquad (2)$$

FIG. 9 is a timing diagram showing a method for compensating for error using a horizontal synchronizing signal Hsync and an active video signal. In FIG. 9, the PLL (Hsync) denotes a horizontal synchronizing signal used in the IVP 27. HTotal denotes a total number of pixels the G/C 19 outputs in a horizontal direction and MousePos denotes actual position of the mouse 11 on the computer site 10. Mode denotes resolution determined by the PLL in the IVP 27 and x denotes where the mouse pointer is displayed on the CDT 7 corresponding to the actual mouse position MousePos. The position x is derived by the IVP 27. The value $\Delta dot\_l$ denotes the time from when the PLL (Hsync) is activated to when video signals are activated. The value $\Delta dot\_r$ denotes the time from when the active video signal is deactivated to when the PLL (Hsync) is reactivated.

The position x is obtained according to Equation (3). The value x' denotes an intermediate coefficient for calculating x:

$$Mode - (\Delta dot\_l + \Delta dot\_r) : x' = HRes : MousePos \qquad (3)$$

$$x' = \frac{[Mode - (\Delta dot\_l + \Delta dot\_r)] \times MousePos}{HRes}$$

$$x = x' + \Delta dot\_l$$

The IVP 27 may not be able to perform certain arithmetic operations. For example, multiplications and divisions whose product and quotient are not a multiple of two. These operations can be performed by the S/W 13. Information about $\Delta dot\_l$ and $\Delta dot\_r$ are obtained from an external source through a read operation. The obtained information is applied to Equation (3) to provide error compensation.

In one example, the S/W 13 (FIG. 3) determines the Mode information for the IVP 27, and transmits the Mode information to the MCU 25. The MCU 25 sets the Mode in the IVP 27, reads information about $\Delta dot\_l$ and $\Delta dot\_r$, and transmits the information to the S/W 13 through the USBs 21 and 15. The S/W 13 determines the position x according to Equation (3) and transmits the value of x to the IVP 27 through the USBs 15 and 21 and the MCU 25.

In another example, the MCU 25 reads Δdot_l and Δdot_r from the IVP 27 in response to the horizontal resolution HRes and actual mouse position MousePos and calculates position x using Equation (3) and then transmits the position x to the IVP 27.

FIG. 10 is a timing diagram showing error compensation using the active video signals output from the G/C 19. In FIG. 10, HTotal denotes a total number of pixels the G/C 19 outputs in a horizontal direction. HStart denotes a start position where the G/C 19 outputs video signals. HRes denotes a horizontal resolution of the active video signals, and the MousePos denotes an actual position of the mouse 11. Mode denotes the screen resolution determined by the IVP 27, and x denotes a position corresponding to the actual mouse position MousePos processed within the IVP 27.

The S/W 13 obtains current setting information for the display 7 from the G/C 19 and generates a proportional value for the pixel number HTotal. For example, assume that pixel number HTotal, start position Hstart, horizontal resolution HRes, and actual mouse position MousePos are 900, 110, 720, and 100, respectively. When the Mode generated by horizontal synchronizing signal PLL (Hsync) is 800, position x corresponding to the actual mouse position MousePos is obtained according to Equation (4):

$$HTotal : (HStart + MousePos) = Mode : x \quad (4)$$
$$x = \frac{(HStart + MousePos) \times Mode}{HTotal}$$
$$x = \frac{(110 + 100) \times 800}{900} = 186.6$$

After having obtained position x according to Equation (4), the S/W 13 transmits the position x to the IVP 27 through the USBs 15 and 21 and MCU 25. In this case, the start position HStart is changed by a width of the horizontal synchronizing signal Hsync caused by the polarity difference. The start position is transmitted from the S/W 13 that has obtained the polarity setting from the G/C 19 to the IVP 27. Alternatively, the IVP 27 may detect the polarity.

Similar to the method for setting a region using the OSD 23, the error compensating method does not need to produce the active video signals using the IVP 27. This allows the active video signals to perform normal operation regardless of the brightness of the background.

FIG. 11 is a timing diagram showing the concept of highlighting a partial region where the entire screen of the CDT 7 is displayed in blue. In FIG. 11, it is assumed that the user sets a region 115 to be highlighted in a display portion 113. The display portion 113 is displayed in blue on a CDT display screen 111. The highlighted region 115 may be set as a rectangle or as a closed curve circle or polygon or any other irregular shape selected by a user.

The process for highlighting the region 115 in the IVP 27 will now be described with reference to FIGS. 3 and 11. The user sets the region 115 to be highlighted by dragging the mouse 11 from point A (H-Start, V-Start) to point B (H-End, V-End) on the displayed portion 113 of the CDT display screen 111. In this case, the highlighted region 115 represents the region converted by the IVP 27.

The S/W 13 generates position data representing upper left coordinates corresponding to point A (H-Start, V-Start) and the lower right coordinates corresponding to point B (H-End, V-End). The S/W 13 also generates the region information identifying the size of the region set by the position data. The position data and the region information are transmitted to the IVP 27 through an interface, such as the USB interfaces 15 and 21.

The IVP 27 receives the position data and the region information and counts point A (H-Start, V-Start) and point B (H-End, V-End) from a first edge of the horizontal synchronizing signal H-Sync or vertical synchronizing signal V-Sync. The IVP 27 generates a highlighting enable signal IBLK, which is activated at point A (H-Start, V-Start) corresponding with the position in the upper left coordinates displayed on the CDT display screen 111. The IVP 27 deactivates IBLK at point B (H-End, V-End) corresponding with the position in the lower right coordinates displayed on the CDT display screen 111. The highlighting enable signal IBLK is thereby activated only in the highlighted region 115. The IVP 27 increases by VB1 or decreases by VB2 the gain of an input blue video signal Vinv during the interval when IBLK is activated, thereby highlighting the region 115.

The IVP 27 receives the input blue video signal Vinv having a peak-peak voltage level VA and increases the gain of the blue signal in the region 115 by VB1. Alternatively, the IVP 27 decreases the blue video signal by VB2, thereby highlighting the region 115. A blue signal in regions other than the region 115, have the peak-peak voltage level VA, which is the same as that of the input video signal Vinv. For example, if the peak-peak voltage level VA is 0.714 V, VB1 and VB2 are generated at 5 dB greater and less than the voltage level VA, respectively.

Preferably, the horizontal synchronizing signal H-sync is at 20–120 KHz, and the vertical synchronizing signal V-sync is at 50–80 Hz. The system clock Sys-CLK is at 20–125 MHz when the horizontal resolution is 1024. A counter (not shown) for counting point A (H-Start, V-Start) and point B (H-End, V-End) is reset on a rising edge of the horizontal synchronizing signal H-sync or the vertical synchronizing signal V-sync.

FIG. 12 is a timing diagram showing the concept of highlighting a partial region when the entire CDT screen 111 is displayed in white. Since highlighting of the partial region shown in FIG. 12 is similar to that shown in FIG. 11, only a brief description will be given. When the CDT display screen 111 is displayed in white, the user drags the mouse 11 from point C (H-Start, V-Start) to point D (H-End, V-End) and sets a region 126 to be highlighted. The IVP 27 receives the position data and region information for region 124 and generates a highlighting enable signal IBLK for the highlighted region 126. The IBLK signal is activated at point C (H-Start, V-Start) and deactivated at point D (H-End, V-End). The IVP 27 increases by VB1 or decreases by VB2 the voltage level of an input white video signal Vinv when the signal IBLK is activated. This highlights the region 126.

FIG. 13 is a block diagram of the IVP 27 according to an embodiment of the present invention. The IVP 27 includes a highlighting enable signal (IBLK) generating circuit 131 and an amplifier circuit (AMP) 135. The IBLK generating circuit 131 receives position data and region information input serially through an I2C data line SDA. The IBLK and I2C data is output to AMP 135 in response to the horizontal synchronizing signal Hsync and the vertical synchronizing signal Vsync. The AMP 135 receives the IBLK signal and the converted position data and region information I2C. The AMP 135 controls the gain and width of the input R/G/B video signals RIN, GIN, and BIN according to the IBLK signal, and outputs the R/G/B video signals ROUT, GOUT, and BOUT with controlled contrast and sharpness.

FIG. 14 is a detailed block diagram of the IBLK generating circuit 131 of FIG. 13. The IBLK generating circuit 131 includes a data receiver 141, a PLL system clock generating circuit 143, a control register 145, an IBLK controller 147, and an output circuit 149. The data receiver 141 receives the position data and the region information input serially through the I2C data line SDA in response to a clock signal input through an I2C clock line SCL. The data receiver 141 receives the position data and the region information serially input to a decoder (not shown). The receiver 141 decodes the position data and the region information from the SDA and SCL signals into parallel I2C data, and outputs the parallel data I2C data to the control register 145 and the AMP 135.

The PLL system clock generating circuit 143 receives horizontal synchronizing signal H-sync and vertical synchronizing signal V-sync through a buffer (not shown) and generates a system clock signal Sys-CLK, a vertical pulse V-pulse, and a horizontal pulse H-pulse. The vertical pulse V-pulse is the same signal as the vertical synchronizing signal V-sync after being buffered by the PLL system clock generating circuit 143. The horizontal pulse H-pulse is the same signal as the horizontal synchronizing signal H-sync after being buffered by the PLL system clock generating circuit 143.

The system clock signal Sys-CLK is used for latching the position data and the region information input through the I2C data line SDA and determines the resolution of the highlighted enable signal IBLK during one horizontal period (1 Thor). For example, the system clock signal Sys-CLK is the product of the frequency and horizontal resolutions of the horizontal synchronizing signal Hsync. The control register 145 latches the parallel I2C data from the data receiver 141 in response to the system clock signal Sys-CLK, and outputs the parallel data I2C data latched while the vertical pulse V-pulse is activated to the IBLK controller 147.

The IBLK controller 147 includes four 11-bit counters (not shown) and two 9-bit counters (not shown). The IBLK controller 147 generates a highlighting enable signal IBLK activated at point A (H-Start, V-Start) and point B (H-End, V-End) corresponding to the signal FCNTL output from the control register 145, the system clock Sys-CLK, the horizontal pulse H-pulse, and the vertical pulse V-pulse.

The four 11-bit counters each count a horizontal start point (H-Start, V-Start), a horizontal end point (H-End, V-Start), a vertical start point (H-Start, V-End), and a vertical end point (H-End, V-End). The four 11-bit counters receive the position data and the region information set in the computer site 10 and converts the same into a region to be highlighted and displayed on the CDT 7. When the position of the highlighted region displayed on the CDT 7 is moved, the two 9-bit counters each count point A (H-Start, V-Start) and point D (H-End, V-End) before movement and the distance by which the point A(H-Start, V-Start) and the point D(H-End, V-End) is moved in horizontal and vertical directions.

The counters for counting the horizontal start point (H-Start, V-Start) and the horizontal end point (H-End, V-Start) are reset on a rising edge of the horizontal synchronizing signal Hsync. The counters divide one period (1 Thor) of the horizontal synchronizing signal Hsync by a predetermined frequency and display coordinates corresponding to the position data and the region information on the CDT 7. The counters used for counting the vertical start point V-Start and the vertical end point V-End are reset on a rising edge of the vertical synchronizing signal Vsync. These counters count the horizontal synchronizing signal Hsync and display coordinates corresponding to the position data and the region information on the CDT 7.

The output circuit 149 receives the output signal from the IBLK controller 147 or an external enable signal EXEN from outside of the IVP 27. The output circuit 149 outputs the highlighting enable signal IBLK. The external enable signal EXEN is a signal generated in the MCU 25 in response to the signal output from the S/W 11 or OSD 23. The EXEN signal is used when a nonrectangular partial region is selected by the user. The external enable signal EXEN is activated only in the region to be highlighted.

FIG. 15 is a detailed block diagram of the AMP 135 shown in FIG. 13. The AMP 135 includes a control signal generating circuit 160 and a gain control circuit 150 for each of the R/G/B channels for adjusting the gain of the R/G/B video signals. The control signal generating circuit 160 includes an IBLK interface 161, an I2C bus interface 163, a conversion circuit 165, and a contrast/sharpness control signal-generating circuit 167. The IBLK interface 160 receives highlighting enable signal IBLK input at a TTL level and outputs a switching control signal IBLK_SW having a predetermined amplitude for switching switch SW1.

FIG. 16 is a detailed circuit diagram of the IBLK interface 161 shown in FIG. 15. The IBLK interface 161 includes a comparator circuit 1601 having a range of 0.5 Volts (V). The comparator circuit 1601 receives the highlighting enable signal IBLK and reference voltage REF and outputs a switching control signal IBLK_SW. The reference voltage REF is preferably DC 2.5 V. The comparator circuit 1601 is designed to eliminate digital noise generated by a supply voltage contained in the highlighting enable signal IBLK and outputs the switching control signal IBLK_SW having a peak-peak voltage of 0.5V.

The I2C bus interface 163 receives the parallel I2C data output from the data receiver 141 (FIG. 14) in response to system clock signal Sys-CLK. The interface 163 latches the I2C data and outputs a signal LData. The conversion circuit 165 converts the LData signal output by the I2C bus interface 163 into an analog current.

FIG. 17 shows the conversion circuit 165 of FIG. 15. The conversion circuit 165 includes a digital-to-analog converter 1651 and a tan h-1 processor 1653. The digital-to-analog converter (DAC) 1651 receives the LData signal output by the I2C bus interface 163 and currents I_SUB and I_CONT. The AMP 135 includes a DAC (not shown) for controlling the gain of the video signal for each of the R/G/B channels and a number N (natural number) of DACs for simultaneously controlling the gain of the video signals of the R/G/B channels.

The tan h-1 processor 1653 outputs a channel contrast control signal I2C_SUB to a channel contrast control circuit 155 in response to current I_SUB, and outputs a contrast control signal I2C_CONT to a contrast control circuit 157 in response to I_CONT.

The contrast/sharpness control signal generating circuit 167 receives the LData output by the I2C bus interface 163 and outputs a switching signal Sh_SW, a sharpness gain control signal Sharp_G, and a sharpness peak width control signal Sharp_W to the sharpness control circuit 153. The sharpness gain control signal Sharp_G and the sharpness peak width control signal Sharp_W may have N bits (N is a natural number) and preferably 3 bits in this embodiment.

The gain control circuit 150 includes a clamp circuit 151, a sharpness control circuit 153, a switching circuit SW1, the channel contrast control circuit 155, the contrast control circuit 157, a video amp 159, an input buffer 152, a mixer 156, and an output buffer 154. The clamp circuit 151 compares an R video signal RIN input for an R channel with a predetermined reference voltage CVREF, and outputs to the switching circuit SW1 a video signal clamped in a predetermined range according to the comparison result.

The clamp circuit 151 performs a sampling using negative feedback during an interval when a horizontal enable signal H-pulse is activated until the low level of the video signal RIN is equal to the predetermined reference voltage CVREF. The clamp circuit 151 outputs the clamped video signal when RIN and CVREF are equal. For example, assume the reference voltage CVREF is DC 2V and the voltage level of the input video signal RIN is peak-peak 0.714 Vp-p. The clamp circuit 151 performs the sampling until the low level of the inputted video signal RIN reaches 2V during the interval when the horizontal enable signal H-pulse is activated. The voltage level of the signal output by the clamp circuit 151 is peak-peak 2.714 Vp-p.

The switching circuit SW1 transmits the signal output of the clamp circuit 151 to the sharpness control circuit 153 or the input buffer 152 in response to switching control signal IBLK_SW. If highlighting enable signal IBLK is activated, the output signal Rva from the clamp circuit 151 is transmitted to the sharpness control circuit 153. If the highlighting enable signal IBLK is deactivated, the Rvb signal from the clamp circuit 151 is transmitted to the input buffer 152.

The buffer 152 receives the signal Rvb from the clamp circuit 151 and buffers the same to the mixer 156. In this case, the gain of the input buffer 152 is preferably 0 dB. The sharpness control circuit 153 adjusts the width and gain of the video signal Rva according to control signals Sharp_G, Sharp_W, and Sh_SW.

FIG. 18 shows in more detail the sharpness control circuit 153. A control signal Sharp_G controls a peak B or C for the video signal Rva. A control signal Sharp_W controls a peak width DW for the video signal Rva. A switching signal Sh_SW controls a switching circuit SW2 in order to control on/off states for the sharpness control circuit 153.

The sharpness control circuit 153 adjusts the gain of the video signal having a peak-peak voltage VA within a range of 0–50% in response to the 3-bit sharpness gain control signal Sharp_G. The sharpness control circuit 153 adjusts a peak width ΔW for the peak B or C. The peak widths for the peaks B and C have a variable range of 50–300 ns in response to the 3-bit sharpness pulse width control signal Sharp_W. ΔSharp denotes a change rate of a peak B or C over the peak-peak voltage VA.

The channel contrast control circuit 155 adjusts the gain of the output signal Vsharp for the sharpness control circuit 153 in response to the channel contrast control signal I2C_SUB. The channel contrast control circuit 155 adjusts the gain of a video signal for only an R channel. The gain for the video signal varied by the channel contrast control circuit 155 have a range of preferably 0–1.5 dB. The channel contrast control circuit 155 is provided for each of the R/G/B channels to control the gain of each of the R/G/B channels.

The contrast control circuit 157 controls the gain of the output signal for the channel contrast control circuit 155 received in response to the contrast control signal I2C_CONT. The contrast control circuit 157 simultaneously controls the gain of video signals for the R/G/B channels in response to the contrast control signal I2C_CONT. The gain that is varied by the contrast control circuit 157 is preferably within the range of 0–3.5 dB. The video amp 159 receives the signal output by the contrast control circuit 157 and amplifies the gain of the video signal for a region to be highlighted up to 5 dB. The c signal output by the video amp 159 preferably has a range of 0–1.2 Vp–p.

FIG. 19 is a timing diagram showing waveforms output by circuits during an interval when the highlighting enable signal IBLK is activated. If the highlighting enable signal IBLK is activated, switching control signal IBLK_SW is activated. A video signal Vinv having a peak-peak voltage level VA of 0.714 V is input to the sharpness control circuit 153 through junction a of the switching circuit SW1.

The sharpness control circuit 153 varies the peak width and gain of the video signal Rva to generate Vsharp according to control signals Sharp_G, Sharp_W, and Sh_SW. The terms ΔSharp_B and ΔSharp_C denote the adjustment rate for the gain of the video signal Vinv as described above.

The output signal c from the video amp 159 has a gain ΔGAIN used for adjusting the video signal in the region to be highlighted. The mixer 156 combines the d signal from the input buffer 152 with the c signal from of the video amp 159 and outputs the e signal to the output buffer 154. The maximum gain of the mixer 156 is 0 dB, and the width of glitch noise that occurs in summing the d and c signals is preferably less than 1 pixel. The output buffer 154 receives the output signal e from the mixer 156 and outputs video signal ROUT that has adjusted contrast and sharpness.

FIG. 20 is a timing diagram showing waveforms output from the AMP 135. Highlighting an R video signal for a region will be described with reference to FIGS. 15 and 20. The same description is applicable for highlighting G and B video signals in the highlighted region.

If highlighting enable signal IBLK is activated, i.e., during a normal video interval, video signal Vinv for the R channel is output to the mixer 156 through the clamp circuit 151, the switching circuit SW1, and the input buffer 152. However, if the highlighting enable signal IBLK is activated, R channel video signal Vinv having a peak-peak 0.714 Vp-p level is input to the sharpness control circuit 153 through the clamp circuit 151 and the switching circuit SW1.

The sharpness control circuit 153 controls the gain ΔSharp_B or ΔSharp_C for video signal Rva having a peak-peak 0.714 Vp-p level in response to control signals Sharp_G and Sharp_W. The channel contrast control circuit 155 receives the output signal from the sharpness control circuit 153 and amplifies the video signal for the highlighted region.

The contrast control circuit 157 and the video amp 159 amplify the video signal for the highlighted region and output the amplified video signal c to the mixer 156. The video signal for the highlighted region has a peak-peak 1.2 Vp-p level. The mixer 156 combines the normal video signal and the highlighted video signal and output the result to the output buffer 154. The output signal Voutv is higher than level VA for the normal video signal by ΔGain and the gain ratio ΔSharp_B.

FIG. 21 is a photograph showing a highlighted partial region. The photograph of FIG. 21 is selected among photographs recorded by a digital camera and displayed on the CDT 7. The user can thus highlight a region with enhanced sharpness and clarity.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. All modifications and variations coming within the spirit and scope are claimed in the following claims.

The invention claimed is:

1. A system for displaying an image, comprising:
   a region selector adapted to identify a selected region of the image;
   a parameter controller adapted to identify user selectable image adjustment parameters for adjusting how the selected region is highlighted and where the selected region is located in the image, wherein the parameter controller generates at least one image adjustment parameter for adjusting the level of contrast for the selected region;
   a gain control circuit that includes
      sharpness and contrast circuitry for highlighting the selected region;
      a buffer for buffering video signals;
      a switching circuit switching the video signals between the sharpness and contrast circuitry and the buffer; and
      a mixer mixing video signals from the sharpness and contrast circuitry with the video signals from the buffer; and
   a display device for displaying the image.

2. A system according to claim 1 wherein the region selector and the parameter controller are located in the display device.

3. A system according to claim 2 wherein the display device is a Color Display Tube, Thin Film Transistor-Liquid Crystal Display, or Plasma Display Panel.

4. A system according to claim 1 wherein the region selector and parameter controller are located in a computer.

5. The system according to claim 4 wherein the parameter controller adjusts for differences in coordinate systems between the computer and the display device.

6. The system according to claim 4 wherein the parameter controller adjusts for differences in resolution between the computer and the display device.

7. A system according to claim 1 wherein the region selector comprises, a pointing device (i.e., mouse) or hotkey.

8. A system according to claim 1 wherein the region selector selects both rectangular and nonrectangular regions.

9. A system according to claim 1 wherein the parameter controller generates the image adjustment parameters for adjusting a gain of video signals for the selected region.

10. A system according to claim 1 wherein the parameter controller generates the image adjustment parameters for controlling a sharpness function for the selected region.

11. A system according to claim 1 including an interface that transfers the image adjustment parameters between a computer and the display device independently from video signals for the image.

12. A system according to claim 1 wherein the parameter controller generates the image adjustment parameters for adjusting the level of sharpness for the entire selected area.

13. A system for controlling highlighting of an image, comprising:
   a computer adapted to generate video signals, identify a selected region of the video signals, and identify image adjustment parameters for identifying and adjusting the selected region in the video signals, wherein at least one of the adjustment parameters adjusts sharpness of the selected region;
   an interface that transfers the selected image adjustment parameters separately from the video signals; and
   a gain control circuit that includes
      sharpness and contrast circuitry for highlighting the selected region;
      a buffer for buffering the video signals;
      a switching circuit switching the video signals between the sharpness and contrast circuitry and the buffer; and
      a mixer mixing video signals from the sharpness and contrast circuitry with the video signals from the buffer.

14. A system according to claim 13 wherein the interface comprises a first port for transmitting the adjustment parameters and a second port for transmitting the video signals.

15. A system according to claim 14 wherein the first port is a Universal Serial Bus port, serial port, plug-and-play, parallel port or fiber optic port and the second port is a graphic card port.

16. A system according to claim 13 wherein the image adjustment parameters and the video signals are all transferred over a same port.

17. A system according to claim 13 wherein the computer compensates the adjustment parameters for differences in a coordinate system between the computer and a display device used for displaying the video signals.

18. A system according to claim 13 wherein the adjustment parameters adjust contrast of the selected region.

19. A system according to claim 13 wherein the computer automatically disables highlighting of the selected region while maintaining a non-highlighted video image when a window containing the selected region is deactivated.

20. The system according to claim 19 wherein the selected regions can be moved in conjunction with a movement of the window.

21. A system according to claim 13 wherein the computer automatically varies size and location of the selected region according to a size and location of a window containing the selected region.

22. An image processor, comprising:
   an input for receiving video signals;
   an input for receiving region information for highlighting a region in the video signals; and
   a control circuit for modifying the video signals according to the region information, wherein the control circuit includes;
      a highlighting signal generating circuit for generating highlighting signals associated with the region information; and
      an amplifier for varying gain of the video signals according to the highlighting signals,
   wherein the amplifier includes;
      a control signal generating circuit that includes a contrast and sharpness control circuit generating contrast and sharpness control signals according to the region information; and
      a gain control circuit that includes
         sharpness and contrast circuitry for highlighting a selected region;

a buffer for buffering the video signals;
a switching circuit switching the video signals between the sharpness and contrast circuitry and the buffer; and
a mixer mixing video signals from the sharpness and contrast circuitry with the video signals from the buffer.

23. An image processor according to claim 22 wherein the control circuit is located in a display device.

24. An image processor according to claim 22 wherein the highlighting signal generating circuit includes:
a data receiver converting serial position and region information into parallel data;
a system clock receiving a horizontal sync signal and a vertical sync signal and outputting a system clock signal, a vertical pulse signal and a horizontal pulse signal;
a control register latching the parallel data from the data receiver according to the system clock; and
a highlight region controller for converting the parallel data into the highlighting signals.

25. An image processor according to claim 22 wherein the control signal generating circuit includes a region signal interface generating a switch control signal according to the highlighting signals.

26. An image processor according to claim 22 wherein the control signal generating circuit includes a I2C bus interface for latching the region information according to a system clock.

27. An image processor according to claim 22 wherein the control signal generating circuit includes a conversion circuit for converting the region information into analog contrast control signals.

28. An image processor according to claim 27 wherein the conversion circuit includes a digital to analog converter and a tan $h^{-1}$ processor.

29. An image processor according to claim 22 wherein the gain control circuit includes a video clamp circuit for clamping the video signals to a predetermined range.

30. An image processor according to claim 22 wherein the gain control circuit includes a sharpness control circuit for varying a peak width and gain of the video signals.

31. An image processor according to claim 22 wherein the gain control circuit includes a channel contrast control circuit for individually adjusting the gain of red, green and blue channels of the video signals according to the region information.

32. An image processor according to claim 22 wherein the gain control circuit includes a contrast control circuit for simultaneously controlling the gain for red, green and blue channels of the video signals.

33. A video processing system, comprising:
a user input for selecting regions of an image and region adjustment parameters for adjusting how the selected region is displayed in the image;
an image processor for highlighting the selected region according to the region adjustment parameters, wherein at least one of the adjustment parameters identify a contrast and sharpness for the selected region; and
a gain control circuit that includes
sharpness and contrast circuitry for highlighting the selected region;
a buffer for buffering video signals;
a switching circuit switching the video signals between the sharpness and contrast circuitry and the buffer; and
a mixer mixing video signals from the sharpness and contrast circuitry with the video signals from the buffer.

34. A system according to claim 33 wherein the image processor includes a region-setting unit for storing the adjustment parameters and region information for the selected region.

35. A system according to claim 33 including a main control unit enabling horizontal line signals for highlighting the selected regions.

36. A system according to claim 33 including a region selector that automatically generates default windows for use as the selected region.

37. A system according to claim 36 wherein the region selector automatically adjusts the size and position of the default window until one of the default windows is selected as the selected region.

38. A system according to claim 33 including software that automatically adjusts the selected region according to horizontal resolution of a graphic card.

* * * * *

UNITED STATES PATENT AND TRADEMARK OFFICE
CERTIFICATE OF CORRECTION

PATENT NO. : 7,191,402 B2
APPLICATION NO. : 10/123392
DATED : March 13, 2007
INVENTOR(S) : Young-Kyu Kim et al.

It is certified that error appears in the above-identified patent and that said Letters Patent is hereby corrected as shown below:

Column 14, line 9, the word "S/W 11" should read -- S/W 13 --;
Column 14, line 44, the words "tan h-1" should read -- tanh-1 --;
Column 14, line 52, the words "tan h-1" should read -- tanh-1 --;
Claim 28 Column 19, line 36, the words "tan h-1" should read -- tanh-1 --.

Signed and Sealed this

Second Day of September, 2008

JON W. DUDAS
*Director of the United States Patent and Trademark Office*